(12) United States Patent
Park

(10) Patent No.: US 6,542,478 B1
(45) Date of Patent: Apr. 1, 2003

(54) DEVICE AND METHOD FOR GENERATING PN SEQUENCE IN CDMA COMMUNICATION SYSTEM

(75) Inventor: Su-Won Park, Taejon (KR)

(73) Assignee: Samsung Electronics, Co., Ltd. (KR)

(*) Notice: Subject to any disclaimer, the term of this patent is extended or adjusted under 35 U.S.C. 154(b) by 0 days.

(21) Appl. No.: 09/274,544

(22) Filed: Mar. 23, 1999

(30) Foreign Application Priority Data

Mar. 23, 1998 (KR) ......................................... 1998-10395

(51) Int. Cl.[7] ............................. H04J 3/20; H04B 7/216

(52) U.S. Cl. ...................................... 370/308; 370/441

(58) Field of Search ................................. 370/203, 208, 370/320, 335, 342, 441; 375/130, 140; 708/250; 331/78

(56) References Cited

U.S. PATENT DOCUMENTS 6,154,456 A * 11/2000 Rakib et al. ................ 370/342

* cited by examiner

Primary Examiner—Wellington Chin
Assistant Examiner—Brenda Pham
(74) Attorney, Agent, or Firm—Dilworth & Barrese, LLP

(57) ABSTRACT

In a code division multiple access (CDMA) communications system, a PN sequence generating device is provided to generate a PN sequence by interleaving of cyclically shifting the symbols of an orthogonal or biorthogonal code in accordance with a pre-defined hopping pattern. A receiver receives simultaneous signals from a plurality of transmitters, where each transmitted signal is spread by a PN sequence generated from the same pre-defined hopping pattern. The receiver is able to differentiate the received signals from each transmitter by varying the amount of interleaving or cyclic shift in each transmitted signal. In the PN sequence generating device, an orthogonal symbol generating portion cyclically shifts mutually orthogonal and periodic orthogonal code sequences, and an orthogonal symbol selector selectively outputs the cyclically shifted orthogonal symbols according to a predetermined pattern.

13 Claims, 24 Drawing Sheets

REFERENCE ORTHOGONAL CODE(ORTHOGONALITY AMONG SYMBOLS)
OC[·;0,1,2,3,4,5,6,7,8,9,10,11,12,13,14,15]=OC[m;0]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | +1 | −1 | +1 | −1 | +1 | −1 | +1 | −1 | +1 | −1 | +1 | −1 | +1 | −1 | +1 | +1 |
| OC2 | +1 | +1 | −1 | −1 | +1 | +1 | −1 | −1 | +1 | +1 | −1 | −1 | +1 | +1 | −1 | −1 |
| OC3 | +1 | −1 | −1 | +1 | +1 | −1 | −1 | +1 | +1 | −1 | −1 | +1 | +1 | −1 | −1 | −1 |
| OC4 | +1 | +1 | +1 | +1 | −1 | −1 | −1 | −1 | +1 | +1 | +1 | +1 | −1 | −1 | −1 | +1 |
| OC5 | +1 | −1 | +1 | −1 | −1 | +1 | −1 | +1 | +1 | −1 | +1 | −1 | −1 | +1 | −1 | −1 |
| OC6 | +1 | +1 | −1 | −1 | −1 | −1 | +1 | +1 | +1 | +1 | −1 | −1 | −1 | −1 | +1 | +1 |
| OC7 | +1 | −1 | −1 | +1 | −1 | +1 | +1 | −1 | +1 | −1 | −1 | +1 | −1 | +1 | +1 | +1 |
| OC8 | +1 | +1 | +1 | +1 | +1 | +1 | +1 | +1 | −1 | −1 | −1 | −1 | −1 | −1 | −1 | −1 |
| OC9 | +1 | −1 | +1 | −1 | +1 | −1 | +1 | −1 | −1 | +1 | −1 | +1 | −1 | +1 | −1 | −1 |
| OC10 | +1 | +1 | −1 | −1 | +1 | +1 | −1 | −1 | −1 | −1 | +1 | +1 | −1 | −1 | +1 | +1 |
| OC11 | +1 | −1 | −1 | +1 | +1 | −1 | −1 | +1 | −1 | +1 | +1 | −1 | −1 | +1 | +1 | −1 |
| OC12 | +1 | +1 | +1 | +1 | −1 | −1 | −1 | −1 | −1 | −1 | −1 | −1 | +1 | +1 | +1 | +1 |
| OC13 | +1 | −1 | +1 | −1 | −1 | +1 | −1 | +1 | −1 | +1 | −1 | +1 | +1 | −1 | +1 | −1 |
| OC14 | +1 | +1 | −1 | −1 | −1 | −1 | +1 | +1 | −1 | −1 | +1 | +1 | +1 | +1 | −1 | −1 |
| OC15 | +1 | −1 | −1 | +1 | −1 | +1 | +1 | −1 | −1 | +1 | +1 | −1 | +1 | −1 | −1 | +1 |

FIG. 5A

MODIFIED ORTHOGONAL CODE(ORTHOGONALITY AMONG SYMBOLS)
OC[·;1,2,3,4,5,6,7,8,9,10,11,12,13,14,15,0]=OC[m;1]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | −1 | +1 | −1 | +1 | −1 | +1 | −1 | +1 | −1 | +1 | −1 | +1 | −1 | +1 | −1 | +1 |
| OC2 | +1 | −1 | −1 | +1 | +1 | −1 | −1 | +1 | +1 | −1 | −1 | +1 | +1 | −1 | −1 | +1 |
| OC3 | −1 | −1 | +1 | +1 | −1 | −1 | +1 | +1 | −1 | −1 | +1 | +1 | −1 | −1 | +1 | +1 |
| OC4 | +1 | +1 | +1 | −1 | −1 | −1 | −1 | +1 | +1 | +1 | +1 | −1 | −1 | −1 | −1 | +1 |
| OC5 | −1 | +1 | −1 | −1 | +1 | −1 | +1 | +1 | −1 | +1 | −1 | −1 | +1 | −1 | +1 | +1 |
| OC6 | +1 | −1 | −1 | −1 | −1 | +1 | +1 | +1 | +1 | −1 | −1 | −1 | −1 | +1 | +1 | +1 |
| OC7 | −1 | −1 | +1 | −1 | +1 | +1 | −1 | +1 | −1 | −1 | +1 | −1 | +1 | +1 | −1 | +1 |
| OC8 | +1 | +1 | +1 | +1 | +1 | +1 | +1 | −1 | −1 | −1 | −1 | −1 | −1 | −1 | −1 | +1 |
| OC9 | −1 | +1 | −1 | +1 | −1 | +1 | −1 | −1 | +1 | −1 | +1 | −1 | +1 | −1 | +1 | +1 |
| OC10 | +1 | −1 | −1 | +1 | +1 | −1 | −1 | −1 | −1 | +1 | +1 | −1 | −1 | +1 | +1 | +1 |
| OC11 | −1 | −1 | +1 | +1 | −1 | −1 | +1 | −1 | +1 | +1 | −1 | −1 | +1 | +1 | −1 | +1 |
| OC12 | +1 | +1 | +1 | −1 | −1 | −1 | −1 | −1 | −1 | −1 | −1 | +1 | +1 | +1 | +1 | +1 |
| OC13 | −1 | +1 | −1 | −1 | +1 | −1 | +1 | −1 | +1 | −1 | +1 | +1 | −1 | +1 | −1 | +1 |
| OC14 | +1 | −1 | −1 | −1 | −1 | +1 | +1 | −1 | −1 | +1 | +1 | +1 | +1 | −1 | −1 | +1 |
| OC15 | −1 | −1 | +1 | −1 | +1 | +1 | −1 | −1 | +1 | +1 | −1 | +1 | −1 | −1 | +1 | +1 |

AUTOCORRELATION WITH REFERENCE ORTHOGONAL VODE

FIG. 5B

MODIFIED ORTHOGONAL CODE(ORTHOGONALITY AMONG SYMBOLS)
OC[·; 3,4,5,6,7,8,9,10,11,12,13,14,15,0,1,2]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | −1 | +1 | −1 | +1 | −1 | +1 | −1 | +1 | −1 | +1 | −1 | +1 | −1 | +1 | −1 | +1 |
| OC2 | −1 | +1 | +1 | −1 | −1 | +1 | +1 | −1 | −1 | +1 | +1 | −1 | −1 | +1 | +1 | −1 |
| OC3 | +1 | +1 | −1 | −1 | +1 | +1 | −1 | −1 | +1 | +1 | −1 | −1 | +1 | +1 | −1 | −1 |
| OC4 | +1 | −1 | −1 | −1 | −1 | +1 | +1 | +1 | +1 | −1 | −1 | −1 | −1 | +1 | +1 | +1 |
| OC5 | −1 | −1 | +1 | −1 | +1 | +1 | −1 | +1 | −1 | −1 | +1 | −1 | +1 | +1 | −1 | +1 |
| OC6 | −1 | −1 | −1 | +1 | +1 | +1 | +1 | −1 | −1 | −1 | −1 | +1 | +1 | +1 | +1 | −1 |
| OC7 | +1 | −1 | +1 | +1 | −1 | +1 | −1 | −1 | +1 | −1 | +1 | +1 | −1 | +1 | −1 | −1 |
| OC8 | +1 | +1 | +1 | +1 | +1 | −1 | −1 | −1 | −1 | −1 | −1 | −1 | −1 | +1 | +1 | +1 |
| OC9 | −1 | +1 | −1 | +1 | −1 | −1 | +1 | −1 | +1 | −1 | +1 | −1 | +1 | +1 | −1 | +1 |
| OC10 | −1 | +1 | +1 | −1 | −1 | −1 | −1 | +1 | +1 | −1 | −1 | +1 | +1 | +1 | +1 | −1 |
| OC11 | +1 | +1 | −1 | −1 | +1 | −1 | +1 | +1 | −1 | −1 | +1 | +1 | −1 | +1 | −1 | −1 |
| OC12 | +1 | −1 | −1 | −1 | −1 | −1 | −1 | −1 | −1 | +1 | +1 | +1 | +1 | +1 | +1 | +1 |
| OC13 | −1 | −1 | +1 | −1 | +1 | −1 | +1 | −1 | +1 | +1 | −1 | +1 | −1 | +1 | −1 | +1 |
| OC14 | −1 | −1 | −1 | +1 | +1 | −1 | −1 | +1 | +1 | +1 | +1 | −1 | −1 | +1 | +1 | −1 |
| OC15 | +1 | −1 | +1 | +1 | −1 | −1 | +1 | +1 | −1 | +1 | −1 | −1 | +1 | +1 | −1 | −1 |

AUTOCORRELATION WITH REFERENCE ORTHOGONAL VODE

FIG. 5C

MODIFIED ORTHOGONAL CODE(ORTHOGONALITY AMONG SYMBOLS)
OC[•;8,9,10,11,12,13,14,15,0,1,2,3,4,5,6,7]

| | | | | | | | | | | | | | | | | |
|---|---|---|---|---|---|---|---|---|---|---|---|---|---|---|---|---|
| OC0  | +1 | +1 | +1 | +1 | +1 | +1 | +1 | +1 | +1 | +1 | +1 | +1 | +1 | +1 | +1 | +1 |
| OC1  | +1 | −1 | +1 | −1 | +1 | −1 | +1 | −1 | +1 | −1 | +1 | −1 | +1 | −1 | +1 | −1 |
| OC2  | +1 | +1 | −1 | −1 | +1 | +1 | −1 | −1 | +1 | +1 | −1 | −1 | +1 | +1 | −1 | −1 |
| OC3  | +1 | −1 | −1 | +1 | +1 | −1 | −1 | +1 | +1 | −1 | −1 | +1 | +1 | −1 | −1 | +1 |
| OC4  | +1 | +1 | +1 | +1 | −1 | −1 | −1 | −1 | +1 | +1 | +1 | +1 | −1 | −1 | −1 | −1 |
| OC5  | +1 | −1 | +1 | −1 | −1 | +1 | −1 | +1 | +1 | −1 | +1 | −1 | −1 | +1 | −1 | +1 |
| OC6  | +1 | +1 | −1 | −1 | −1 | −1 | +1 | +1 | +1 | +1 | −1 | −1 | −1 | −1 | +1 | +1 |
| OC7  | +1 | −1 | −1 | +1 | −1 | +1 | +1 | −1 | +1 | −1 | −1 | +1 | −1 | +1 | +1 | −1 |
| OC8  | −1 | −1 | −1 | −1 | −1 | −1 | −1 | −1 | +1 | +1 | +1 | +1 | +1 | +1 | +1 | +1 |
| OC9  | −1 | +1 | −1 | +1 | −1 | +1 | −1 | +1 | +1 | −1 | +1 | −1 | +1 | −1 | +1 | −1 |
| OC10 | −1 | −1 | +1 | +1 | −1 | −1 | +1 | +1 | +1 | +1 | −1 | −1 | +1 | +1 | −1 | −1 |
| OC11 | −1 | +1 | +1 | −1 | −1 | +1 | +1 | −1 | +1 | −1 | −1 | +1 | +1 | −1 | −1 | +1 |
| OC12 | −1 | −1 | −1 | −1 | +1 | +1 | +1 | +1 | +1 | +1 | +1 | +1 | −1 | −1 | −1 | −1 |
| OC13 | −1 | +1 | −1 | +1 | +1 | −1 | +1 | −1 | +1 | −1 | +1 | −1 | −1 | +1 | −1 | +1 |
| OC14 | −1 | −1 | +1 | +1 | +1 | +1 | −1 | −1 | +1 | +1 | −1 | −1 | −1 | −1 | +1 | +1 |
| OC15 | −1 | +1 | +1 | −1 | +1 | −1 | −1 | +1 | +1 | −1 | −1 | +1 | −1 | +1 | +1 | −1 |

AUTOCORRELATION WITH REFERENCE ORTHOGONAL VODE

FIG. 5D

MODIFIED ORTHOGONAL CODE(ORTHOGONALITY AMONG SYMBOLS)
OC[•;0,1,14,3,4,5,6,7,8,9,10,11,12,13,2,15]

| | | | | | | | | | | | | | | | | |
|---|---|---|---|---|---|---|---|---|---|---|---|---|---|---|---|---|
| OC0  | +1 | +1 | +1 | +1 | +1 | +1 | +1 | +1 | +1 | +1 | +1 | +1 | +1 | +1 | +1 | +1 |
| OC1  | +1 | -1 | +1 | -1 | +1 | -1 | +1 | -1 | +1 | -1 | +1 | -1 | +1 | -1 | +1 | -1 |
| OC2  | +1 | +1 | -1 | -1 | +1 | +1 | -1 | -1 | +1 | +1 | -1 | -1 | +1 | +1 | -1 | -1 |
| OC3  | +1 | -1 | -1 | +1 | +1 | -1 | -1 | +1 | +1 | -1 | -1 | +1 | +1 | -1 | -1 | +1 |
| OC4  | +1 | +1 | -1 | +1 | -1 | -1 | -1 | -1 | +1 | +1 | +1 | +1 | -1 | -1 | +1 | -1 |
| OC5  | +1 | -1 | -1 | -1 | +1 | -1 | +1 | +1 | -1 | +1 | -1 | -1 | +1 | +1 | +1 | +1 |
| OC6  | +1 | +1 | +1 | -1 | -1 | -1 | +1 | +1 | +1 | +1 | -1 | -1 | -1 | -1 | -1 | +1 |
| OC7  | +1 | -1 | +1 | +1 | -1 | +1 | +1 | -1 | +1 | -1 | -1 | +1 | -1 | +1 | -1 | -1 |
| OC8  | +1 | +1 | -1 | +1 | +1 | +1 | +1 | +1 | -1 | -1 | -1 | -1 | -1 | -1 | +1 | -1 |
| OC9  | +1 | -1 | -1 | -1 | +1 | -1 | +1 | -1 | -1 | +1 | -1 | +1 | -1 | +1 | +1 | +1 |
| OC10 | +1 | +1 | +1 | -1 | +1 | +1 | -1 | -1 | -1 | -1 | +1 | +1 | -1 | -1 | -1 | +1 |
| OC11 | +1 | -1 | +1 | +1 | +1 | -1 | -1 | +1 | -1 | +1 | +1 | -1 | -1 | +1 | -1 | -1 |
| OC12 | +1 | +1 | +1 | +1 | -1 | -1 | -1 | -1 | -1 | -1 | -1 | -1 | +1 | +1 | +1 | +1 |
| OC13 | +1 | -1 | +1 | -1 | -1 | +1 | -1 | +1 | -1 | +1 | -1 | +1 | +1 | -1 | +1 | -1 |
| OC14 | +1 | +1 | -1 | -1 | -1 | -1 | +1 | +1 | -1 | -1 | +1 | +1 | +1 | +1 | -1 | -1 |
| OC15 | +1 | -1 | -1 | +1 | -1 | +1 | +1 | -1 | -1 | +1 | +1 | -1 | +1 | -1 | -1 | +1 |

CROSS-CORRELATION WITH REFERENCE ORTHOGONAL VODE

FIG. 5E

MODIFIED ORTHOGONAL CODE(ORTHOGONALITY AMONG SYMBOLS)
OC[•;0,1,2,3,12,5,6,7,8,9,10,11,4,13,14,15]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | +1 | −1 | +1 | −1 | +1 | −1 | +1 | −1 | +1 | −1 | +1 | −1 | +1 | −1 | +1 | −1 |
| OC2 | +1 | +1 | −1 | −1 | +1 | +1 | −1 | −1 | +1 | +1 | −1 | −1 | +1 | +1 | −1 | −1 |
| OC3 | +1 | −1 | −1 | +1 | +1 | −1 | −1 | +1 | +1 | −1 | −1 | +1 | +1 | −1 | −1 | +1 |
| OC4 | +1 | +1 | +1 | +1 | −1 | −1 | −1 | −1 | +1 | +1 | +1 | +1 | −1 | −1 | −1 | −1 |
| OC5 | +1 | −1 | +1 | −1 | −1 | +1 | −1 | +1 | +1 | −1 | +1 | −1 | −1 | +1 | −1 | +1 |
| OC6 | +1 | +1 | −1 | −1 | −1 | −1 | +1 | +1 | +1 | +1 | −1 | −1 | −1 | −1 | +1 | +1 |
| OC7 | +1 | −1 | −1 | +1 | −1 | +1 | +1 | −1 | +1 | −1 | −1 | +1 | −1 | +1 | +1 | −1 |
| OC8 | +1 | +1 | +1 | +1 | −1 | +1 | +1 | +1 | −1 | −1 | −1 | −1 | +1 | −1 | −1 | −1 |
| OC9 | +1 | −1 | +1 | −1 | −1 | −1 | +1 | −1 | −1 | +1 | −1 | +1 | +1 | +1 | −1 | +1 |
| OC10 | +1 | +1 | −1 | −1 | −1 | −1 | −1 | −1 | −1 | −1 | +1 | +1 | +1 | −1 | +1 | +1 |
| OC11 | +1 | −1 | +1 | +1 | +1 | −1 | −1 | +1 | −1 | +1 | +1 | −1 | −1 | +1 | −1 | −1 |
| OC12 | +1 | +1 | +1 | +1 | +1 | −1 | −1 | −1 | −1 | −1 | −1 | −1 | −1 | +1 | +1 | +1 |
| OC13 | +1 | −1 | +1 | −1 | +1 | −1 | +1 | −1 | −1 | +1 | −1 | +1 | −1 | −1 | +1 | −1 |
| OC14 | +1 | +1 | −1 | −1 | +1 | −1 | +1 | +1 | −1 | −1 | +1 | +1 | −1 | +1 | −1 | −1 |
| OC15 | +1 | −1 | −1 | +1 | +1 | +1 | +1 | −1 | −1 | +1 | +1 | −1 | −1 | −1 | −1 | +1 |

CROSS-CORRELATION WITH REFERENCE ORTHOGONAL VODE

FIG. 5F

MODIFIED ORTHOGONAL CODE(ORTHOGONALITY AMONG SYMBOLS)
OC[•;0,1,12,3,4,5,2,7,8,9,10,11,6,13,14,15]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | +1 | −1 | +1 | −1 | +1 | −1 | +1 | −1 | +1 | −1 | +1 | −1 | +1 | −1 | +1 | −1 |
| OC2 | +1 | +1 | +1 | −1 | +1 | +1 | −1 | −1 | +1 | +1 | −1 | −1 | −1 | +1 | −1 | −1 |
| OC3 | +1 | −1 | +1 | +1 | +1 | −1 | −1 | +1 | +1 | −1 | −1 | +1 | −1 | −1 | −1 | +1 |
| OC4 | +1 | +1 | −1 | +1 | −1 | −1 | +1 | −1 | +1 | +1 | +1 | +1 | −1 | −1 | −1 | −1 |
| OC5 | +1 | −1 | −1 | −1 | −1 | +1 | +1 | +1 | +1 | −1 | +1 | −1 | −1 | +1 | −1 | +1 |
| OC6 | +1 | +1 | −1 | −1 | −1 | −1 | −1 | +1 | +1 | +1 | −1 | −1 | +1 | −1 | +1 | +1 |
| OC7 | +1 | −1 | −1 | +1 | −1 | +1 | −1 | −1 | +1 | −1 | −1 | +1 | +1 | +1 | +1 | −1 |
| OC8 | +1 | +1 | −1 | +1 | +1 | +1 | +1 | +1 | −1 | −1 | −1 | −1 | +1 | −1 | −1 | −1 |
| OC9 | +1 | −1 | −1 | −1 | +1 | −1 | +1 | −1 | −1 | +1 | −1 | +1 | +1 | +1 | −1 | +1 |
| OC10 | +1 | +1 | −1 | −1 | +1 | +1 | −1 | −1 | −1 | −1 | +1 | +1 | −1 | −1 | +1 | +1 |
| OC11 | +1 | −1 | −1 | +1 | +1 | −1 | −1 | +1 | −1 | +1 | +1 | −1 | −1 | +1 | +1 | −1 |
| OC12 | +1 | +1 | +1 | +1 | −1 | −1 | −1 | −1 | −1 | −1 | −1 | −1 | +1 | +1 | +1 | +1 |
| OC13 | +1 | −1 | +1 | −1 | −1 | +1 | +1 | +1 | −1 | +1 | −1 | +1 | −1 | −1 | +1 | −1 |
| OC14 | +1 | +1 | +1 | −1 | −1 | −1 | −1 | +1 | −1 | +1 | +1 | +1 | +1 | +1 | −1 | −1 |
| OC15 | +1 | −1 | +1 | +1 | −1 | +1 | −1 | −1 | −1 | +1 | +1 | −1 | +1 | −1 | −1 | +1 |

CROSS-CORRELATION WITH REFERENCE ORTHOGONAL VODE

FIG. 5G

MODIFIED ORTHOGONAL CODE(ORTHOGONALITY AMONG SYMBOLS)
OC[•; 0,14,2,3,8,5,6,7,1,9,10,11,12,13,4,15]

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | +1 | +1 | +1 | −1 | +1 | −1 | +1 | −1 | −1 | −1 | +1 | −1 | +1 | −1 | +1 | −1 |
| OC2 | +1 | −1 | −1 | −1 | +1 | +1 | −1 | −1 | +1 | +1 | −1 | −1 | +1 | +1 | +1 | −1 |
| OC3 | +1 | −1 | −1 | +1 | +1 | −1 | −1 | +1 | −1 | −1 | −1 | +1 | +1 | −1 | +1 | +1 |
| OC4 | +1 | −1 | +1 | +1 | +1 | −1 | −1 | −1 | +1 | +1 | +1 | +1 | −1 | −1 | −1 | −1 |
| OC5 | +1 | −1 | +1 | −1 | +1 | +1 | +1 | +1 | −1 | −1 | +1 | −1 | −1 | +1 | −1 | +1 |
| OC6 | +1 | +1 | −1 | −1 | +1 | −1 | +1 | +1 | +1 | +1 | −1 | −1 | −1 | −1 | −1 | +1 |
| OC7 | +1 | +1 | −1 | +1 | +1 | +1 | +1 | −1 | −1 | −1 | −1 | +1 | −1 | +1 | −1 | −1 |
| OC8 | +1 | −1 | +1 | +1 | −1 | +1 | +1 | +1 | +1 | −1 | −1 | −1 | −1 | −1 | +1 | −1 |
| OC9 | +1 | −1 | +1 | −1 | −1 | −1 | +1 | −1 | −1 | +1 | −1 | +1 | −1 | +1 | +1 | +1 |
| OC10 | +1 | +1 | −1 | −1 | −1 | +1 | −1 | −1 | +1 | −1 | +1 | +1 | −1 | −1 | +1 | +1 |
| OC11 | +1 | +1 | −1 | +1 | −1 | −1 | −1 | +1 | −1 | +1 | +1 | −1 | −1 | +1 | +1 | −1 |
| OC12 | +1 | +1 | +1 | +1 | −1 | −1 | −1 | −1 | +1 | −1 | −1 | −1 | +1 | +1 | −1 | +1 |
| OC13 | +1 | +1 | +1 | −1 | −1 | −1 | +1 | +1 | −1 | +1 | −1 | +1 | +1 | −1 | −1 | −1 |
| OC14 | +1 | −1 | −1 | −1 | −1 | −1 | +1 | +1 | +1 | −1 | +1 | +1 | +1 | +1 | −1 | −1 |
| OC15 | +1 | −1 | −1 | +1 | −1 | +1 | +1 | −1 | +1 | +1 | +1 | −1 | +1 | −1 | −1 | +1 |

CROSS-CORRELATION WITH REFERENCE ORTHOGONAL VODE

FIG. 5H

REFERENCE ORTHOGONAL CODE(ORTHOGONALITY AMONG SYMBOLS)
OC[•;0,1,2,3,4,5,6,7,8,9,10,11,12,13,14,15]

| | | | | | | | | | | | | | | | | |
|---|---|---|---|---|---|---|---|---|---|---|---|---|---|---|---|---|
| OC0  | +1 | +1 | +1 | +1 | +1 | +1 | +1 | +1 | +1 | +1 | +1 | +1 | +1 | +1 | +1 | +1 |
| OC1  | +1 | −1 | +1 | −1 | +1 | −1 | +1 | −1 | +1 | −1 | +1 | −1 | +1 | −1 | +1 | −1 |
| OC2  | +1 | +1 | −1 | −1 | +1 | +1 | −1 | −1 | +1 | +1 | −1 | −1 | +1 | +1 | −1 | −1 |
| OC3  | +1 | −1 | −1 | +1 | +1 | −1 | −1 | +1 | +1 | −1 | −1 | +1 | +1 | −1 | −1 | +1 |
| OC4  | +1 | +1 | +1 | +1 | −1 | −1 | −1 | −1 | +1 | +1 | +1 | +1 | −1 | −1 | −1 | −1 |
| OC5  | +1 | −1 | +1 | −1 | −1 | +1 | −1 | +1 | +1 | −1 | +1 | −1 | −1 | +1 | −1 | +1 |
| OC6  | +1 | +1 | −1 | −1 | −1 | −1 | +1 | +1 | +1 | +1 | −1 | −1 | −1 | −1 | +1 | +1 |
| OC7  | +1 | −1 | −1 | +1 | −1 | +1 | +1 | −1 | +1 | −1 | −1 | +1 | −1 | +1 | +1 | −1 |
| OC8  | +1 | +1 | +1 | +1 | +1 | +1 | +1 | +1 | −1 | −1 | −1 | −1 | −1 | −1 | −1 | −1 |
| OC9  | +1 | −1 | +1 | −1 | +1 | −1 | +1 | −1 | −1 | +1 | −1 | +1 | −1 | +1 | −1 | +1 |
| OC10 | +1 | +1 | −1 | −1 | +1 | +1 | −1 | −1 | −1 | −1 | +1 | +1 | −1 | −1 | +1 | +1 |
| OC11 | +1 | −1 | −1 | +1 | +1 | −1 | −1 | +1 | −1 | +1 | +1 | −1 | −1 | +1 | +1 | −1 |
| OC12 | +1 | +1 | +1 | +1 | −1 | −1 | −1 | −1 | −1 | −1 | −1 | −1 | +1 | +1 | +1 | +1 |
| OC13 | +1 | −1 | +1 | −1 | −1 | +1 | −1 | +1 | −1 | +1 | −1 | +1 | +1 | −1 | +1 | −1 |
| OC14 | +1 | +1 | −1 | −1 | −1 | −1 | +1 | +1 | −1 | −1 | +1 | +1 | +1 | +1 | −1 | −1 |
| OC15 | +1 | −1 | −1 | +1 | −1 | +1 | +1 | −1 | −1 | +1 | +1 | −1 | +1 | −1 | −1 | +1 |

FIG. 6A

MODIFIED ORTHOGONAL CODE(ORTHOGONALITY LOST AMONG SYMBOLS)

| | | | | | | | | | | | | | | | | |
|---|---|---|---|---|---|---|---|---|---|---|---|---|---|---|---|---|
| OC0 | +1 | +1 | +1 | +1 | +1 | +1 | +1 | +1 | +1 | +1 | +1 | +1 | +1 | +1 | +1 | +1 |
| OC1 | -1 | +1 | -1 | +1 | -1 | +1 | -1 | +1 | -1 | +1 | -1 | +1 | -1 | +1 | -1 | +1 |
| OC2 | -1 | +1 | +1 | -1 | -1 | +1 | +1 | -1 | -1 | +1 | +1 | -1 | -1 | +1 | +1 | -1 |
| OC3 | +1 | +1 | -1 | -1 | +1 | +1 | -1 | -1 | +1 | +1 | -1 | -1 | +1 | +1 | -1 | -1 |
| OC4 | +1 | +1 | +1 | -1 | -1 | -1 | +1 | +1 | +1 | +1 | -1 | -1 | -1 | -1 | +1 | +1 |
| OC5 | +1 | -1 | +1 | +1 | -1 | +1 | -1 | -1 | +1 | -1 | +1 | +1 | -1 | +1 | -1 | -1 |
| OC6 | -1 | +1 | +1 | +1 | +1 | -1 | -1 | -1 | -1 | +1 | +1 | +1 | +1 | -1 | -1 | -1 |
| OC7 | +1 | +1 | -1 | +1 | -1 | -1 | +1 | -1 | +1 | +1 | -1 | +1 | -1 | -1 | +1 | -1 |
| OC8 | +1 | -1 | -1 | -1 | -1 | -1 | -1 | -1 | -1 | +1 | +1 | +1 | +1 | +1 | +1 | +1 |
| OC9 | +1 | -1 | +1 | -1 | +1 | -1 | -1 | +1 | -1 | +1 | -1 | +1 | -1 | +1 | +1 | -1 |
| OC10 | -1 | -1 | +1 | +1 | -1 | -1 | -1 | -1 | +1 | +1 | -1 | -1 | +1 | +1 | +1 | +1 |
| OC11 | +1 | -1 | -1 | +1 | -1 | +1 | +1 | -1 | -1 | +1 | +1 | -1 | -1 | -1 | -1 | +1 |
| OC12 | +1 | +1 | +1 | -1 | -1 | -1 | -1 | -1 | -1 | -1 | +1 | -1 | +1 | +1 | +1 | +1 |
| OC13 | +1 | -1 | +1 | -1 | -1 | +1 | -1 | -1 | -1 | +1 | -1 | +1 | +1 | +1 | +1 | -1 |
| OC14 | +1 | +1 | -1 | -1 | -1 | -1 | +1 | +1 | +1 | -1 | +1 | -1 | +1 | -1 | -1 | -1 |
| OC15 | -1 | +1 | -1 | -1 | +1 | +1 | -1 | -1 | +1 | -1 | +1 | +1 | -1 | -1 | +1 | +1 |

AUTOCORRELATION AND CROSS-CORRELATION WITH REFERENCE ORTHOGONAL CODE)

DEVICE AND METHOD FOR GENERATING PN SEQUENCE IN CDMA COMMUNICATION SYSTEM

CLAIM OF PRIORITY

This application makes reference to, incorporates the same herein, and claims all benefits accruing under 35 U.S.C. §119 from an application entitled DEVICE AND METHOD FOR GENERATING PN SEQUENCE IN CDMA COMMUNICATION SYSTEM earlier filed in the Korean Industrial Property Office on Mar. 23, 1998, and there duly assigned Ser. No. 98-10395.

BACKGROUND OF THE INVENTION

1. Field of the Invention

The present invention relates generally to a Code Division Multiple Access System (CDMA), and more particularly, to a device and method for generating a PN (PseudoNoise) sequence by orthogonal code hopping.

2. Description of the Related Art

Generally, symbols of an orthogonal or biorthogonal code are hopped according to a predetermined hopping pattern in each of a plurality of transmitters in an asynchronous CDMA base station to generate a PN sequence. Asynchronous base stations can use PN sequences to allow a mobile station to identify them. A plurality of slots (e.g., 16 slots) are assigned to one frame. A period of hopped orthogonal Gold code is sent in each slot. Since the orthogonal Gold code hopping patterns are different in the plurality of slots, the mobile station can identify a corresponding base station. If the mobile station can detect the starting point of one frame, it can discriminate a base station from others by determining the offset of the orthogonal Gold code in each slot from the frame starting point. The PN sequence may be used for spread spectrum or scrambling in the case where a different orthogonal code is used for channel identification. A particular receiver may simultaneously receive signals from a corresponding transmitter as well as from transmitters communicating with other receivers. If the plurality of signals, which contain data symbols to be despread, share the same PN sequence and the same orthogonal code (e.g., Walsh code) for channel identification, the receiver will be able to simultaneously despread the signals but fail to recover the intended data symbols. In the case of a periodic PN sequence, data symbols cannot periodically be recovered.

FIGS. 1A and 1B are schematic views of conventional PN sequence generators based on orthogonal code hopping and orthogonal Gold code hopping, respectively. FIGS. 1C and 1D are schematic views of conventional PN sequence generators based on biorthogonal code hopping and biorthogonal Gold code hopping, respectively.

FIGS. 2A and 2B illustrate a case where a receiver simultaneously receives the same orthogonal or biorthogonal code from different transmitters using PN sequence generators, based on possibly different hopping patterns, and cannot discriminate between data symbols through despreading. When an orthogonal code other than a PN sequence is used for distinguishing a communication channel in a transmitter, only data symbols using the same channel identifying orthogonal code avoid discrimination since collision occurs when the orthogonal code for generating a PN sequence and the orthogonal code for channelization of two received signals are the same. As illustrated in FIGS. 2A and 2B, a PN sequence $PN_A$ of a transmitter A 210 and a PN sequence $PN_B$ of a transmitter B 260 are generated from the same orthogonal code, however, each uses a different hopping pattern. In FIG. 2B, though an orthogonal code OC3 is simultaneously received from the transmitters A 210 and B 260 (See FIG. 2A), only the data symbol using a channel identifying orthogonal spreading code W2 in the orthogonal code OC3 is lost due to symbol collision. That is, all of the coincident symbols in the respective PN sequences which are identical cannot be recovered (i.e., OC3). If the strengths of the signals received from the respective transmitters A 210 and B 260 are equal, they cannot be discriminated. If one is far stronger than the other, the stronger signal can be discriminated.

Orthogonal or biorthogonal codes for use in PN sequence generation include, but are not restricted to Walsh codes, Hardamard codes, Gold codes, and the like.

Referring to FIG. 1A, reference numeral 110 denotes a PN sequence generator, constructed in accordance with the prior art, based on orthogonal code hopping. Reference numerals 120, 130, and 140 are orthogonal symbol generators to generate orthogonal codes. A selector 150 selectively outputs orthogonal symbols generated from each of the respective orthogonal symbol generators 120 to 140 according to an orthogonal symbol hopping pattern provided by hopping pattern generator 160. The selector 150 outputs a PN sequence from the selected symbols. The orthogonal symbol hopping pattern generator 160 generates an orthogonal code hopping pattern under a predetermined rule. It is to be noted here that like reference numerals denote the same components in the drawings.

FIG. 1B is a schematic view of PN sequence generator based on orthogonal Gold code hopping. In FIG. 1B, the orthogonal symbol hopping pattern generator 160 determines an initial value for an m-sequence (with a period of 2n−1) generator 163. An initial value register 162 stores the determined initial value. Another m-sequence generator 167 with a period of 2n−1 generates an m-sequence having an initial value with no relation to the initial value stored in initial value register 162. This second generated initial value is stored in an initial value register 166. A Gold sequence is generated by exclusive-ORing the outputs of the two m-sequence generators 163 and 167 by an exclusive-OR gate 164. To change the Gold sequence to an orthogonal Gold code, the operations of the m-sequence generators 163 and 167 are stopped for one clock period if the status value, which is the initial stored value of the m-sequence generator 167, of the m-sequence generator 167 is equal to a predetermined reference value as determined by comparator 169. Each m sequence generator generates (2n−1) m-sequences in one period. (2n−1) sequences are also produced by adding the output values of the two m-sequence generators symbol by symbol. To obtain $2^n$ orthogonal Gold sequences from the (2n−1) sequences, a zero is inserted in a predetermined position of the (2n−1) sequences where the status value, (i.e., initial value of the m-sequence generator) is identical to a reference value. Zero is inserted in the same position in the next period because the m-sequence generator generates period m-sequences. The reference value can be determined depending on where zero is to be inserted in an orthogonal Gold code sequence, and the insertion position can be predefined freely. Whenever the values are equal, a switch 168 normally connected to the output of the exclusive-OR gate 164 is switched to select a zero value for insertion into the Gold sequence. Otherwise, when the values are not equal, the m-sequence generators 163 and 167 are operated again.

FIG. 1C is a schematic view of a conventional PN sequence generator based on biorthogonal code hopping, modified from the PN sequence generator based on orthogonal code hopping. If there are 32 orthogonal symbol generators, each orthogonal symbol generator periodically generates a corresponding orthogonal sequence. For example, the hopping pattern of the orthogonal symbol hopping pattern generator 160 is 1,3,5,7,9,11,13,15,17,19, 21,23,25,27,29,31,2,4,6,8,10,12,14,16,18,20,22,24,26,28, 30,32. The biorthogonal symbol hopping pattern generator 170 generates one additional bit to the hopping pattern generated by generator 160. This one bit may be MSB or LSB and indicates a sign. By passing the additional bit through the XOR gate 190, not 64 PN sequences are generated instead of 32. Given orthogonal codes of the same length provided as input to hopping pattern generators 160 and 170, the output of a biorthogonal symbol hopping pattern generator 170 is twice as long as the orthogonal symbol hopping pattern generator 160 output. The output of the biorthogonal symbol hopping pattern generator 170 passes an additional bit such as an MSB (Most Significant Bit) or LSB (Least Significant Bit) through an exclusive-OR gate which is similar to the sign bit of the generated orthogonal code symbol. That is, the number of elements in the biorthogonal code set is twice as large as that of orthogonal codes by adding signs (i.e., "+" and "−") to the orthogonal codes. To indicate the sign, one bit is additionally assigned to an orthogonal code number. FIG. 1D illustrates biorthogonal Gold code hopping which illustrates a modification of the apparatus of FIG. 1B for biorthogonal codes.

FIGS. 2A and 2B illustrate data symbol loss in a receiver which may occur when a plurality of transmitters use PN sequences generated from different transmitters which simultaneously transmit signals to the receiver, where each transmitter transmits one of the following conventional orthogonal codes: orthogonal, orthogonal gold, biorthogonal and biorthogonal gold code hopping.

The transmitter A 210 generates the PN sequence $PN_A$ by hopping orthogonal or biorthogonal codes in a predetermined hopping pattern indicated by 220. Reference numeral 230 denotes data symbols of the PN sequence $PN_A$ to be used for spreading or scrambling. The transmitter B 260 generates the PN sequence $PN_B$ by hopping orthogonal or biorthogonal codes in a predetermined hopping pattern indicated by 270. Reference numeral 280 denotes data symbols of the PN sequence $PN_B$ to be used for spreading or scrambling. If signals from the transmitters A 210 and B 260 arrive at a receiver 200 at similar levels and share the same orthogonal symbols in their respective hopping patterns as shown in FIGS. 2A and 2B, it is difficult to discriminate one from the other. For example, as illustrated in FIG. 2a, orthogonal code OC3 is simultaneously received at the receiver causing a collision period.

FIG. 2B is a magnified view of a symbol collision period. As illustrated in FIG. 2B, all data symbols are not damaged by the collision. Only the data symbols loaded on channels sharing the same channel identifying orthogonal code are lost as indicated by 232 and 274. Here, a Walsh code is used as an example. With reference to the example shown, only the data symbols sharing the same orthogonal code, that is, Walsh code W2, are lost among the totality of data symbols in each of the respective communication channels (i.e., W1, W2 and W3). Further, if a hopping pattern is repeated periodically, data loss will also be periodic.

SUMMARY OF THE INVENTION

A general object of the present invention is to provide a PN sequence (i.e., orthogonal code) generating device and PN sequence generating method in a CDMA communication system which can overcome the data collision problems described above.

Another object of the present invention is to provide a device and method for generating a PN sequence (i.e., orthogonal code) to overcome data collision problems by performing a cyclic shift on the symbols of an orthogonal ode according to a hopping pattern.

A further object of the present invention is to provide a device and method for generating a PN sequence (i.e., orthogonal code) based on orthogonal or biorthogonal code hopping to prevent simultaneous despreading of data symbols received from a plurality of transmitters.

According to the present invention, as embodied and broadly described herein, there is provided a PN sequence generating device and method in a CDMA communication system. In the PN sequence generating device, an orthogonal symbol generating portion cyclically shifts mutually orthogonal and/or periodic orthogonal code sequences, and an orthogonal symbol selector selectively outputs the cyclically shifted orthogonal symbols according to a predetermined pattern.

BRIEF DESCRIPTION OF THE DRAWINGS

The above objects and advantages of the present invention will become more apparent by describing in detail preferred embodiments thereof with reference to the attached drawings in which:

FIGS. 5A to 5H illustrate orthogonal code sets each having orthogonal symbols subject to the same cyclic shift or interleaving in order to maintain orthogonality among the orthogonal symbols to be hopped according to a hopping pattern; and FIGS. 6A and 6B respectively illustrate a reference orthogonal code set and an orthogonal code set in which each orthogonal code has orthogonal symbols to be hopped according to a hopping pattern, which are subject to different cyclic shift or interleaving and thus lose mutual orthogonality.

DETAILED DESCRIPTION OF THE PREFERRED EMBODIMENTS

Figure 1A:
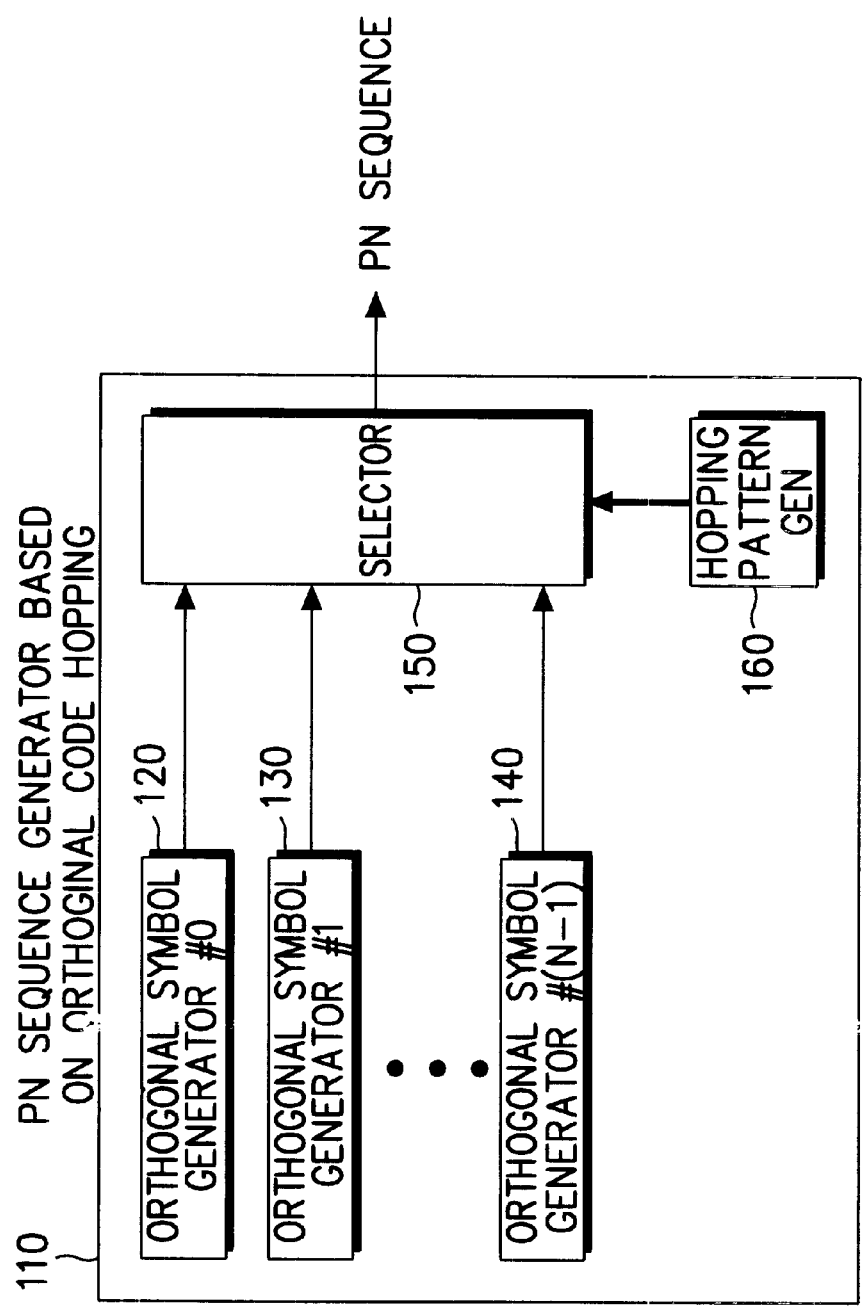
FIGS. 1A to 1D are schematic views of conventional PN sequence generators based on orthogonal, orthogonal Gold, biorthogonal, and biorthogonal Gold code hopping, respectively.
Figure 1B:
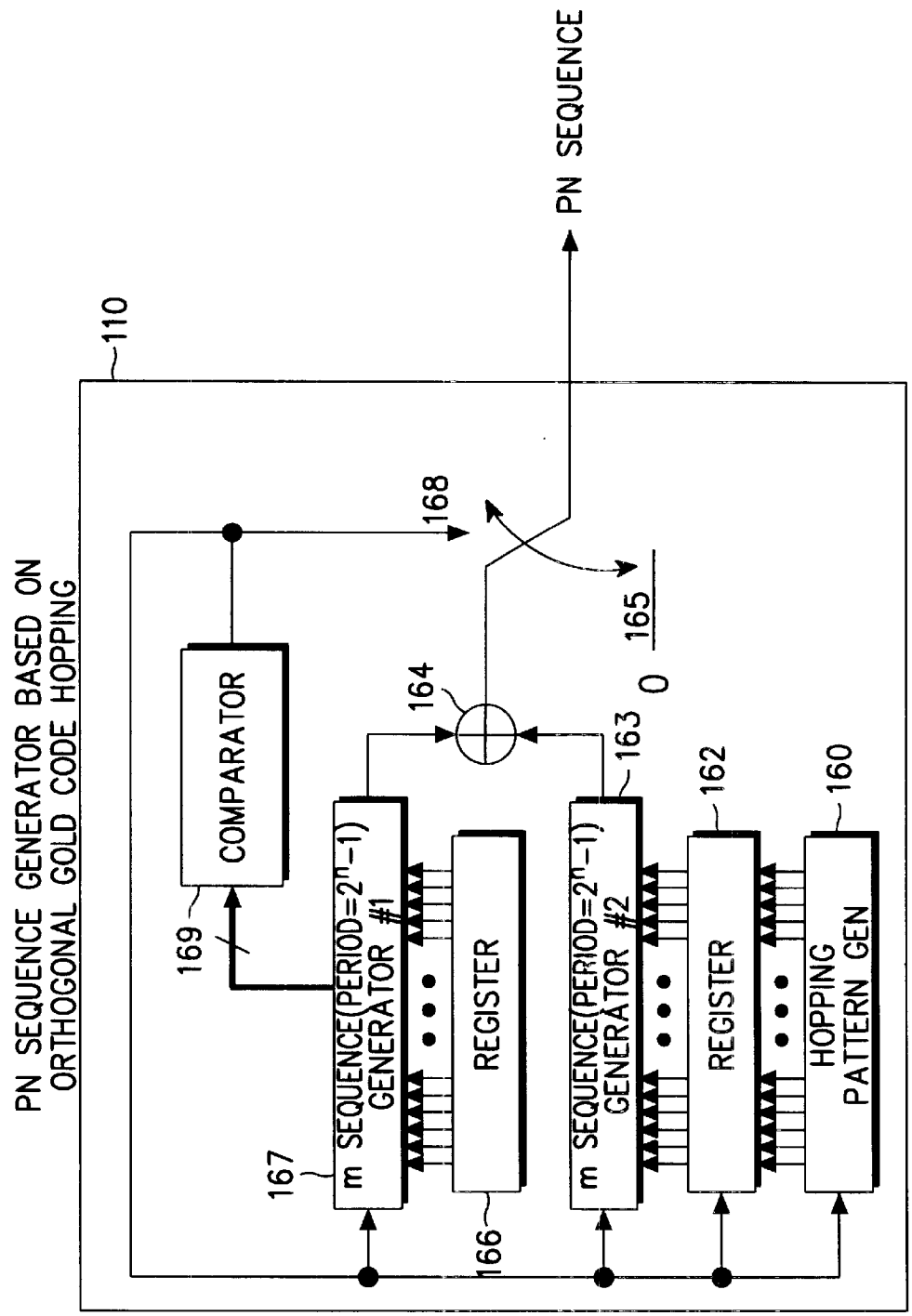
Figure 1C:
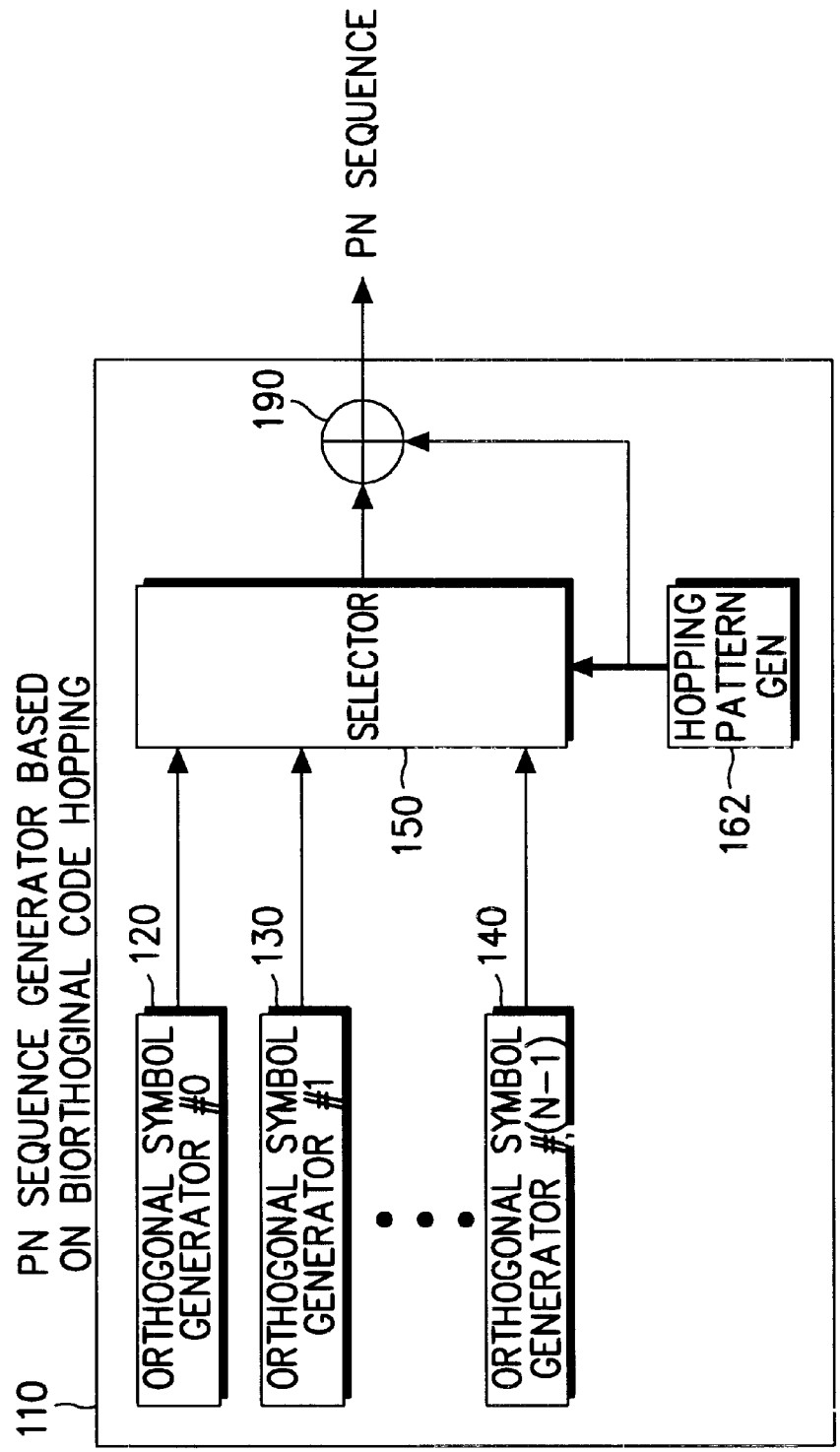
Figure 1D:
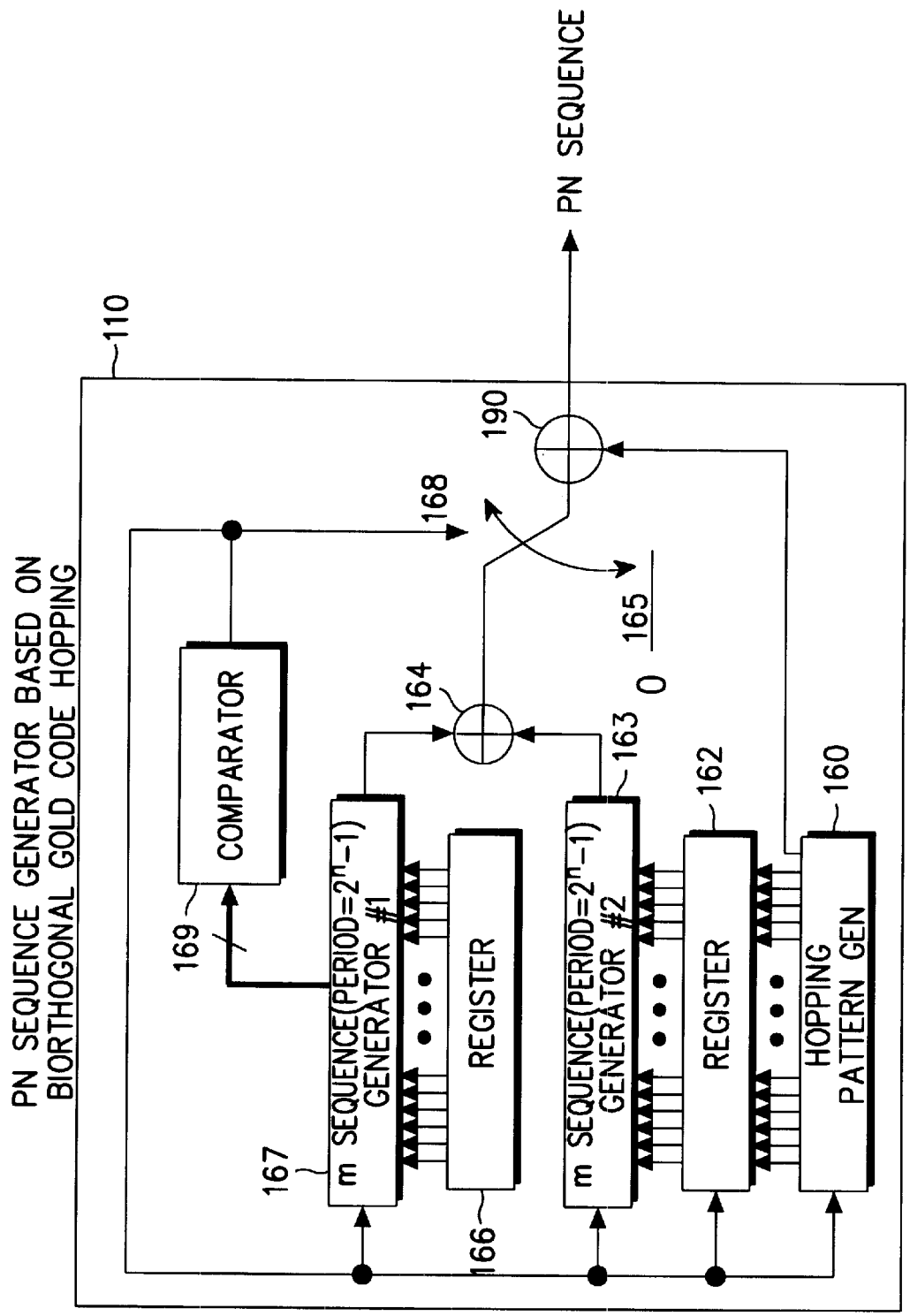
Figure 2A:
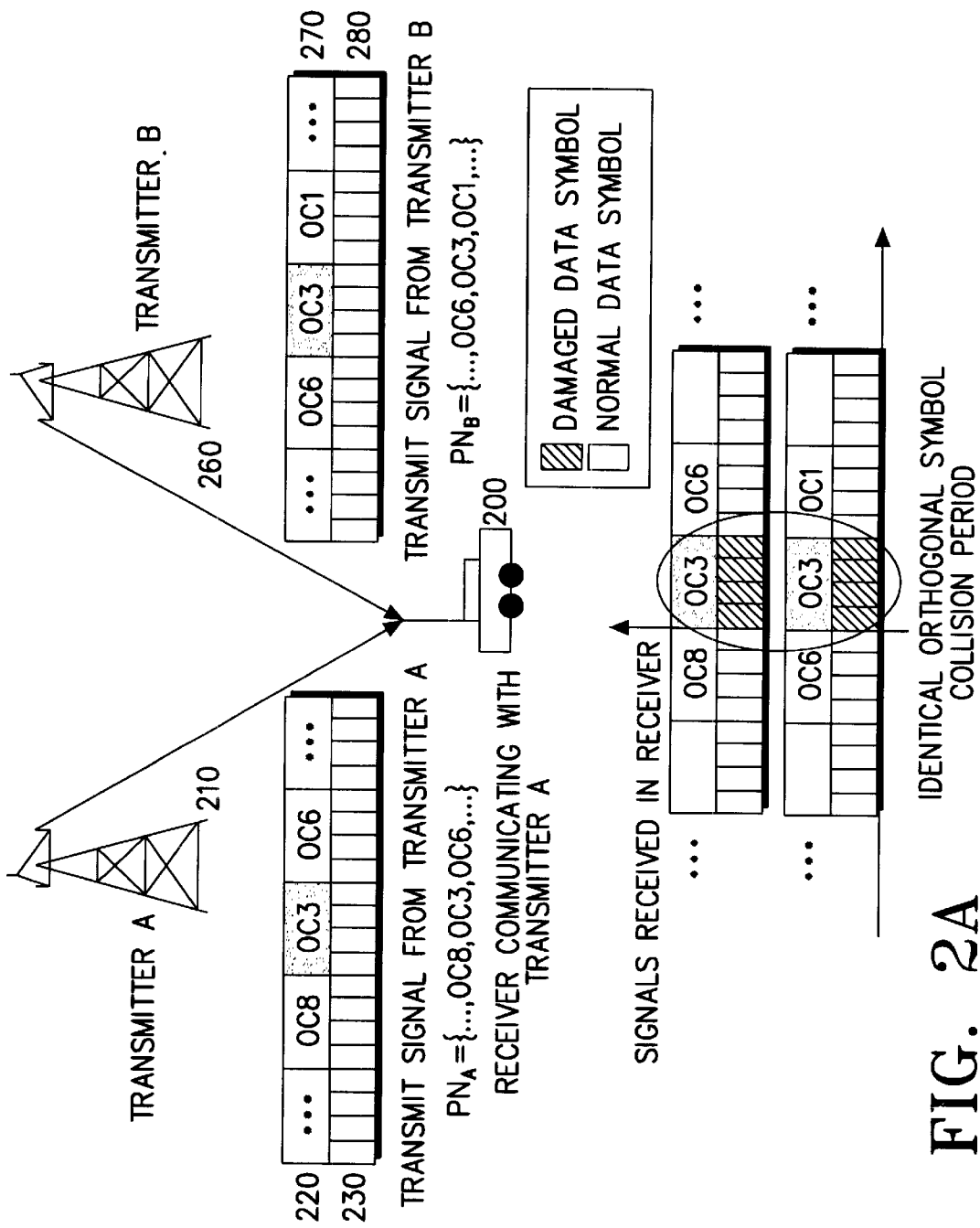
FIGS. 2A and 2B illustrate data symbol loss in a receiver due to collision between signals generated from different transmitters based on conventional orthogonal, orthogonal Gold, biorthogonal, or biorthogonal Gold code hopping.
Figure 2B:
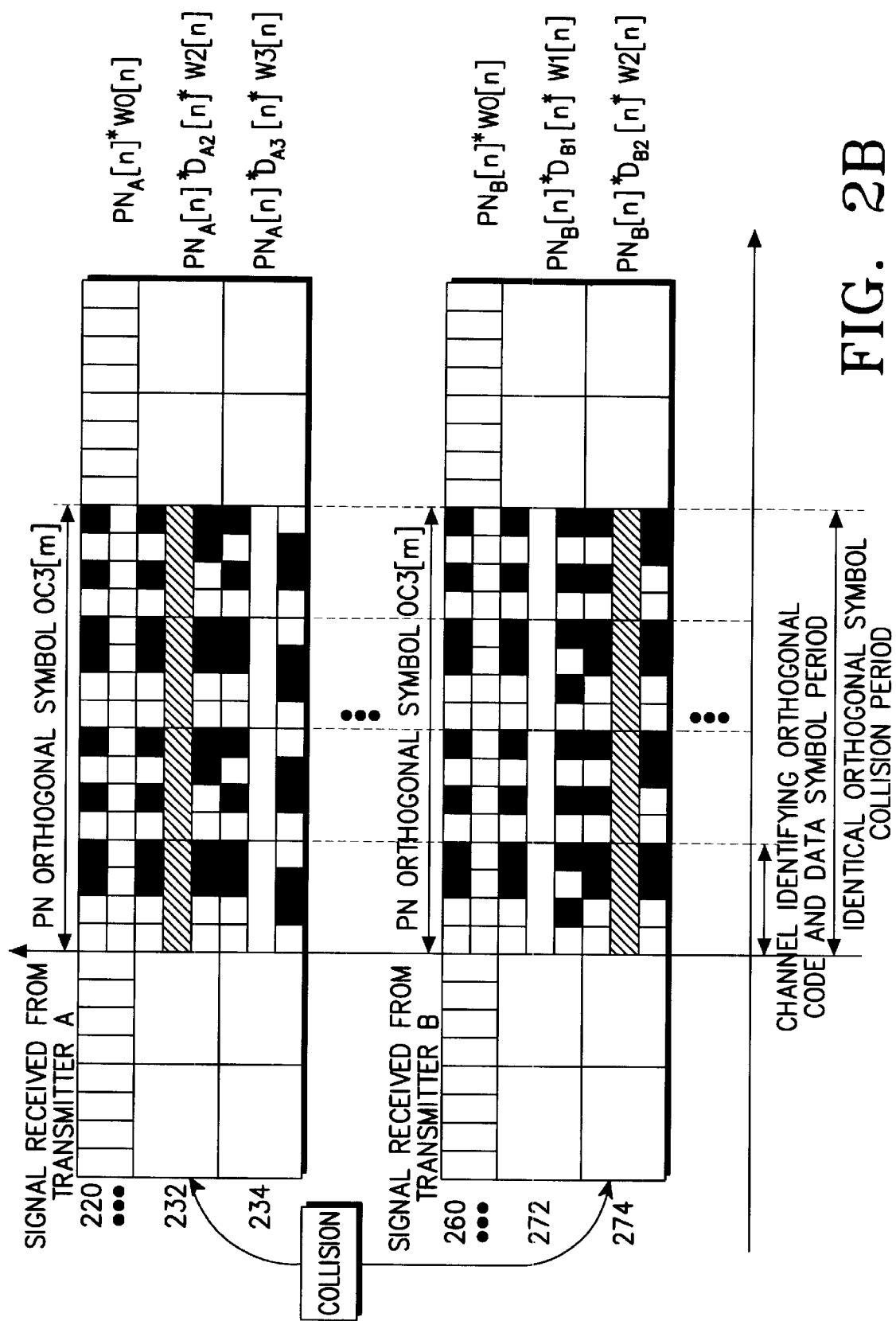

Reference is now make in detail to the present preferred embodiments of the invention, examples of which are illustrated in the accompanying drawings. It is to be noted that like reference numerals denote the same components in the drawings.

FIGS. 3A to 3F are schematic views of PN sequence (orthogonal code) generators based on hopping, delay, and interleaving of orthogonal or biorthogonal codes according to embodiments of the present invention.

Figure 3A:
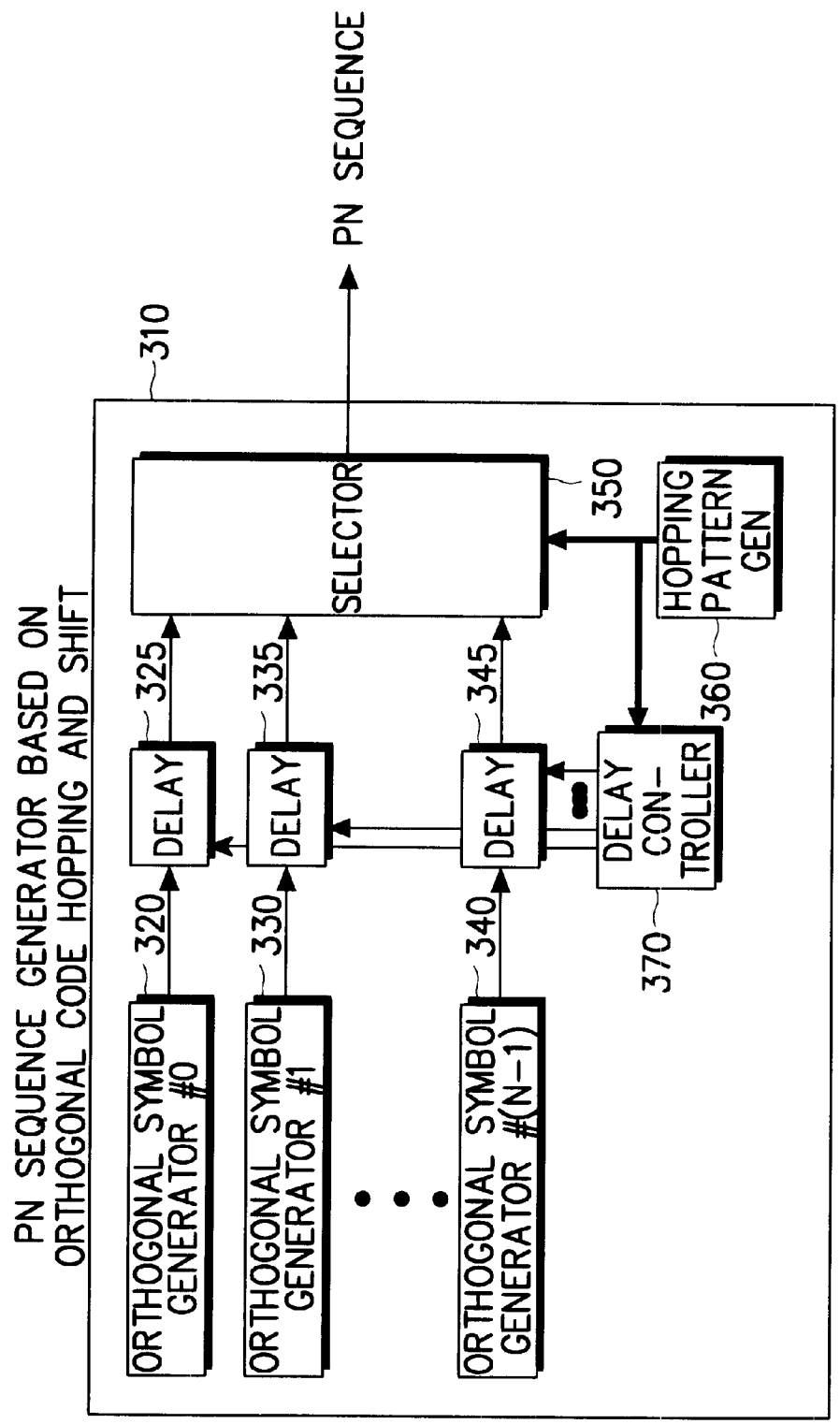
FIGS. 3A to 3F are schematic views of PN sequence generators based on orthogonal, orthogonal Gold, biorthogonal, and biorthogonal Gold code hopping according to embodiments of the present invention.

FIG. 3A illustrates a PN sequence (orthogonal code) generator according to a first embodiment of the present invention. Referring to FIG. 3A, an orthogonal symbol hopping pattern generator 360 generates a predetermined orthogonal code hopping pattern. A delay controller 370 generates a delay control signal in accordance with the hopping pattern received from the orthogonal symbol hopping pattern generator 360. The present invention envisions similar apparatus, such as that described in FIG. 3A, to be deployed at a plurality of base stations whereby signal collision is prevented by setting different hopping patterns and delay amounts at each base station. Orthogonal symbol generators 320 to 340 generate corresponding orthogonal symbols to be hopped. That is, each orthogonal symbol generator generates a code sequence corresponding to a specific Walsh code number. Orthogonal symbols output from generators 320 to 340 are supplied to one of the respective delays 325 to 345. An orthogonal symbol selector 350 selects one of the delayed orthogonal symbols received from the delays 325 to 345. The amount of delay and particular symbol selected are made under the control of the orthogonal symbol hopping pattern generator 360.

In operation, the orthogonal symbol generators 320 to 340 each generate an orthogonal code sequences as shown in FIGS. 5A and 6A. The code sequences are hopped according to a hopping pattern defined by symbol hopping pattern generator 360. The hopping pattern represents the order in which code sequences are sent. The delays 325 to 345 delay the outputs of the orthogonal symbol generators 320 to 340 to be cyclically shifted by a number of symbols, predetermined by a delay controller 370. What cyclically shifted means is as follows: (A1A2A3*A10) (A1A2A3*A10)* is changed to (A2A3*A10A1) (A2A3*A10A1)* where (*) is the peod. The orthogonal symbol selector 350 selectively outputs the delayed orthogonal symbols received from each of the respective delays 325 to 345 according to hopping pattern information received from the orthogonal symbol hopping pattern generator 360 to thereby produce a PN sequence.

FIG. 5A illustrates an exemplary reference orthogonal code set, and FIGS. 5B, 5C, and 5D are related figures which illustrate the code set of FIG. 5a modified while maintaining orthogonality. The code sets of FIGS. 5B, 5C, and 5D are obtained by cyclically shifting the reference orthogonal code set in the PN sequence generator, as shown in FIG. 3A. In the drawings, shaded portions indicate cyclically shifted chips in the respective rows, as determined by the delay controller 370.

Figure 3B:
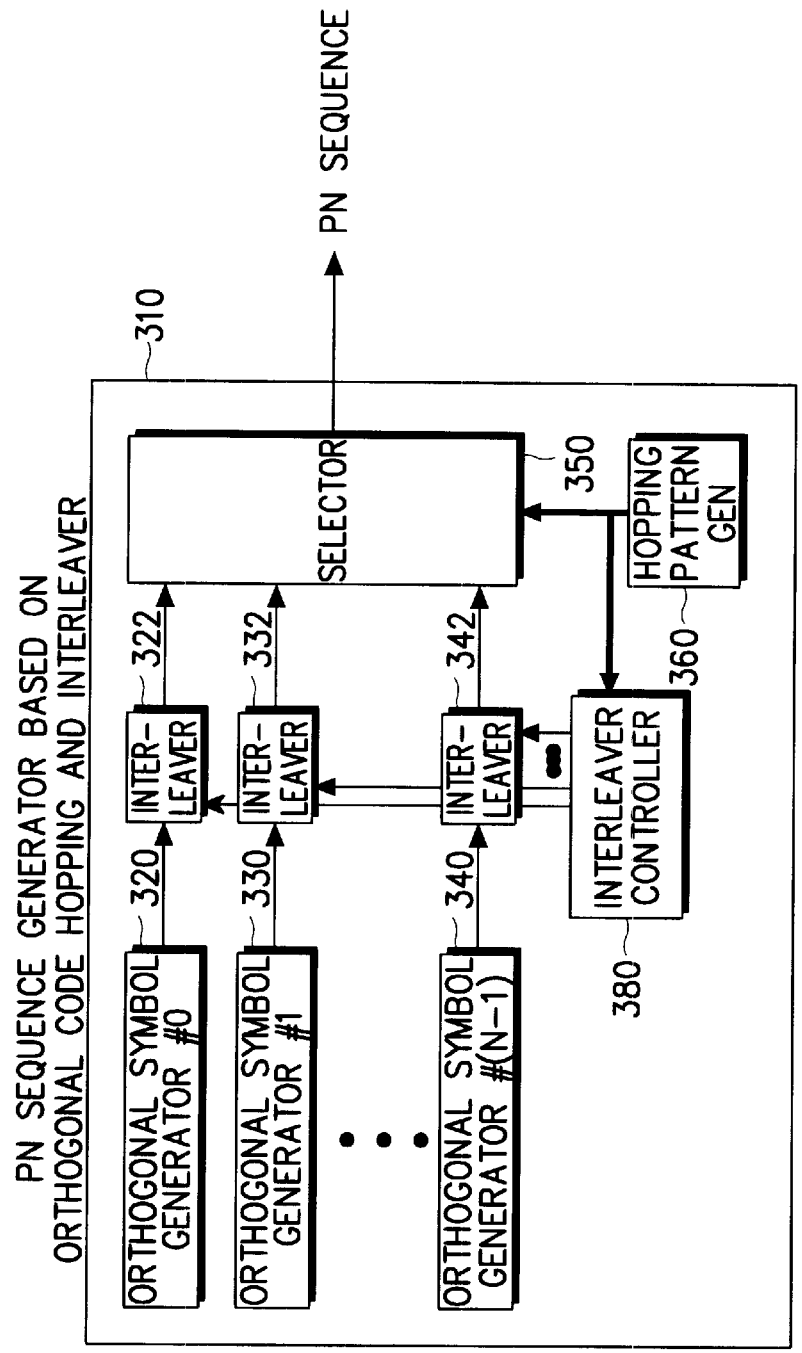

FIG. 3B is a schematic view of a PN sequence generator according to a second embodiment of the present invention. Referring to FIG. 3B, the orthogonal symbol hopping pattern generator 360 generates predetermined hopping pattern information of an orthogonal code. An interleaver controller 380 generates an interleaving control signal based on the hopping pattern information received from the orthogonal symbol hopping pattern generator 360. The orthogonal symbol generators 320 to 340 generate their corresponding orthogonal symbols, that is, rows of reference orthogonal symbols (i.e., orthogonal code sequences), shown in FIG. 5A or 6A, to be hopped. Interleavers 322 to 342 interleave orthogonal symbols received from the orthogonal symbol generators 320 to 340 under the control of the interleaver controller 380. The orthogonal symbol selector 350 selectively outputs the interleaved orthogonal symbols under the control of the orthogonal symbol hopping pattern generator 360.

In operation, the orthogonal symbol generators 320 to 340 of FIG. 3B generate orthogonal symbols to be hopped according to a hopping pattern as in FIG. 3A. The orthogonal symbol hopping pattern generator 360 generates the hopping pattern information for an orthogonal code. The interleaver controller 380 controls interleaving of the orthogonal symbols, and the interleavers 322 to 342 interleave the orthogonal symbols received from the orthogonal symbol generators 320 to 340 in chip units according to the hopping pattern. This interleaving scheme is different in each base station, thereby preventing signal collision. The orthogonal symbol selector 350 selectively outputs the symbols received from the interleavers 322 to 342 according to the hopping pattern information defined by hoping pattern generator 360.

FIGS. 5E to 5H illustrate modified orthogonal code sets with orthogonality maintained, which are obtained by interleaving the reference orthogonal code sets of FIG. 5A in a PN sequence generator such as the one shown in FIG. 3B. Shaded portions indicate interleaved chips, that is, columns locations that have been exchanged. In the present embodiment, the delays 325 to 345 of FIG. 3A are replaced by the interleavers 322 to 342 of FIG. 3B, resulting in the same effects in generating a PN sequence. Control of the delays 325 to 345 and the interleavers 322 to 342 over a different number of orthogonal symbols in each orthogonal code produces modified sequences shown in FIG. 6B, which lose orthogonality since the modified code symbol is not included in the orthogonal code set.

Figure 3C:
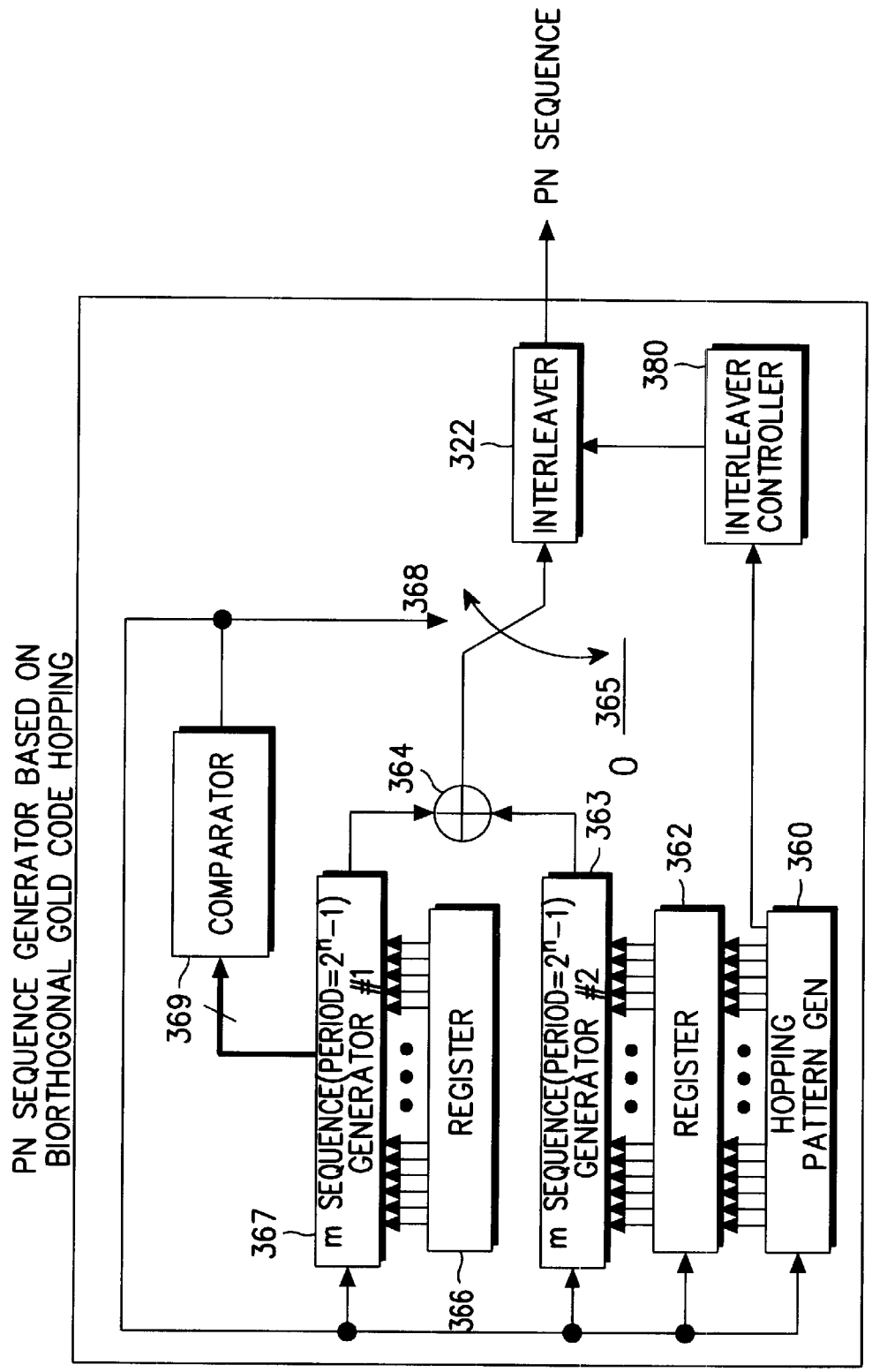

FIG. 3C is a schematic view of a PN sequence generator based on orthogonal Gold code hopping according to a third embodiment of the present invention. Referring to FIG. 3C, the orthogonal symbol hopping pattern generator 360 generates hopping pattern information of an orthogonal code. The interleaver controller 380 generates an interleaving control signal according to the hopping pattern information received from the orthogonal symbol hopping pattern generator 360. An initial value register 366 stores an initial value, and an m-sequence generator 367 reads the initial value from the initial value register 366 and generates a first m-sequence corresponding to the supplied initial value. An initial value register 362 stores the hopping pattern information as an initial value, and a second m-sequence generator 363 generates a second m-sequence corresponding to the initial value received from the initial value register 362. Therefore, the m-sequence generators 363 and 367 output first and second m-sequences, different from each other as a consequence of different supplied initial values. An exclusive-OR gate 364 exclusive-ORs the outputs of the m-sequence generators 363 and 367 to produce a Gold sequence. A comparator 369 compares the status (i.e., initial stored) value of the m-sequence generator 367 with a predetermined value and generates a switch controlling signal according to the comparison result. A switch 368 is selectively coupled to both a zero input value 365 and the output of the exclusive-OR gate 364. The switch 365 selects the zero input for one clock period by the switch controlling signal received from the comparator 369 if the output of the m-sequence generator 367 is equal to the predetermined value. Otherwise, if they are different, the switch 368 selects the output of the exclusive-OR gate 364, that is, the Gold sequence. The switch 368 may be implemented as a multiplexer. The interleaver controller 380 generates a control signal for interleaving the symbols received from the switch 368 according to the hopping pattern information received from the orthogonal symbol hopping pattern generator 360. The interleaver 322 interleaves the output of the switch 368 under the control of the interleaver controller 380 to produce a PN sequence.

In operation, the orthogonal symbol hopping pattern generator 360 determines an initial value for the m-sequence (with a period of $2^n-1$) generator 363. The determined initial value is stored in the register 362. Another m-sequence, generator 367 (with a period of $2^n-1$) generates an m-sequence whose initial value is wholly unrelated to the orthogonal symbol hopping pattern generator 360. The initial value for m-sequence generator 367 is stored in the register 366. The outputs of the two m-sequence generators 363 and 367 are exclusive-ORed to produce Gold sequence as output from the exclusive-OR gate 364. To generate an orthogonal Gold code from the Gold sequence, the comparator 369 compares the status value of the m-sequence generator 367 with a predetermined value. If they are equal, the m-sequence generators 363 and 367 are stopped for one clock period, and the switch 368 inserts a zero value into the Gold sequence for the one clock period. If they are different, however, the Gold sequence is selected by the switch 368. Then, the interleaver 322 interleaves the output of the switch 368 under the control of the interleaver controller 380. As an exemplary output of this process, FIGS. 5E–5H illustrate interleaved versions of FIG. 5A.

Figure 3D:
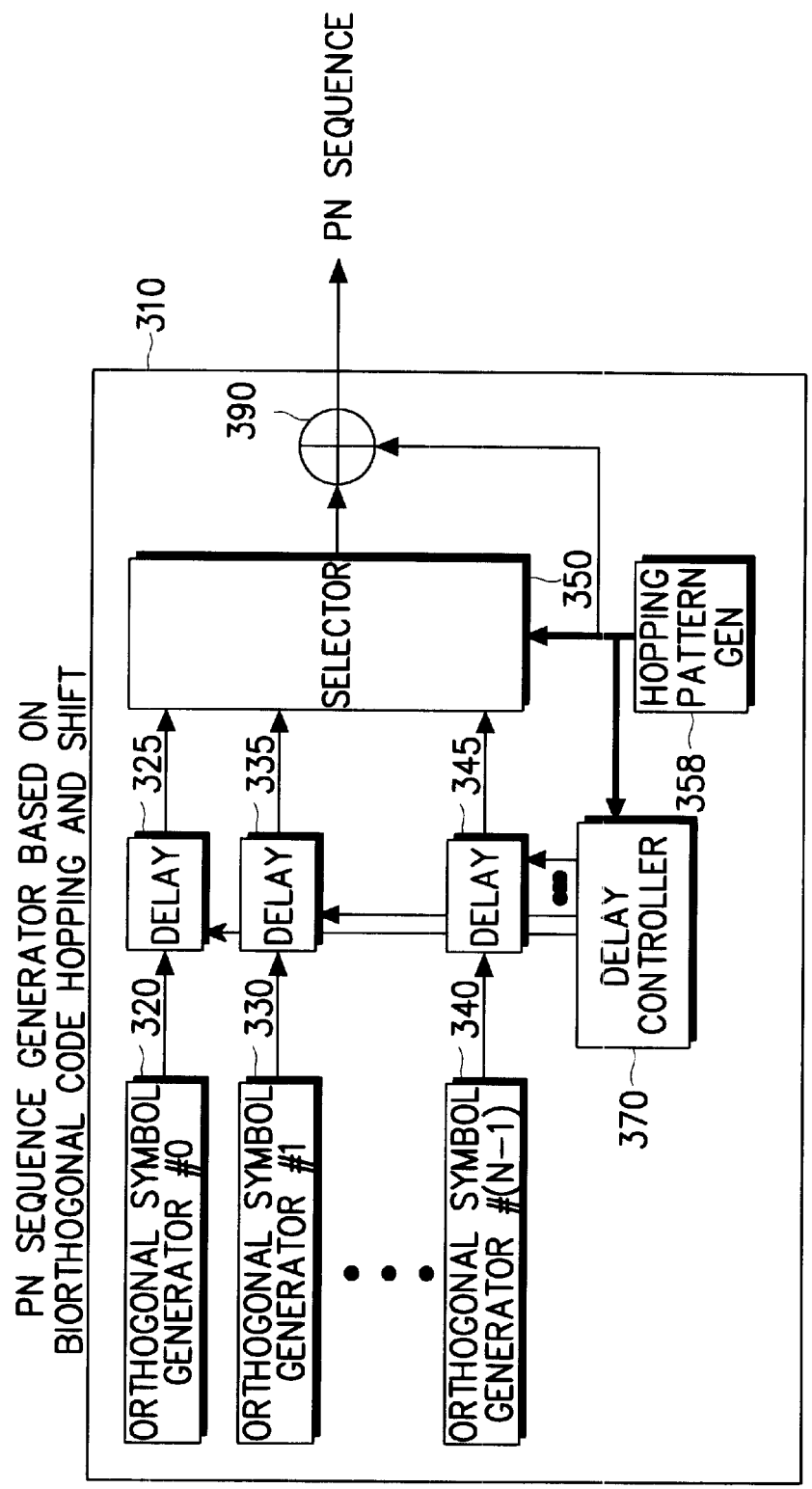

FIG. 3D is a schematic view of a PN sequence generator according to a fourth embodiment of the present invention. Referring to FIG. 3D, a biorthogonal symbol hopping pattern generator 358 generates hopping pattern information. The delay controller 370 generates a delay control signal in accordance with the hopping pattern received from the biorthogonal symbol hopping pattern generator 358. It should be noted that there is no requirement in the present invention for configuring the orthogonal (biorthogonal) symbol hopping pattern generator in relation to an interleaver controller for determining an interleaving pattern or a delay controller for controlling a delay amount. In other words, the delay amount or an interleaving pattern is generated independent of the hopping pattern generator and provided thereto. However, it is required that each base station should have a different delay amount or interleaving pattern. Therefore, since each base station has a different hopping pattern, the base station will have a different delay amount or interleaving pattern if it uses a delay amount or interleaving the pattern corresponding to its unique hopping pattern in an embodiment of the present invention. The orthogonal symbol generators 320 to 340 generate corresponding code sequences to be hopped. The delays 325 to 345 delay orthogonal symbols received from the orthogonal symbol generators 320 to 340 under the control of the delay controller 370. An orthogonal symbol selector 350 selects one of the delayed orthogonal symbols received from the delays 325 to 345 at every orthogonal code sequence duration time under the control of the biorthogonal symbol hopping pattern generator 358. The exclusive-OR gate 390 exclusive-ORs the orthogonal symbol sequence received from the orthogonal symbol selector 350 and code bits of the biorthogonal code hopping pattern information to produce a PN sequence.

It is apparent, therefore, that the PN sequence generator of FIG. 3D is operationally equivalent to the PN sequence generator based on orthogonal code hopping. The biorthogonal symbol generators 320 to 340 generate biorthogonal symbols to be hopped according to a hopping pattern, generated by the symbol hopping pattern generator 358. The delays 325 to 345 delay the outputs of the biorthogonal symbol generators 320 to 340 to be cyclically shifted, where a delay controller 370 determines how many symbols to delay. The orthogonal symbol selector 350 selectively outputs the delayed orthogonal symbols received from the delays 325 to 345 according to hopping pattern information received from the biorthogonal symbol hopping pattern generator 358 to thereby produce a PN sequence. Given that the orthogonal symbol generators 320 to 340 generate orthogonal symbols of the same length as in previous embodiments the output of the biorthogonal symbol hopping pattern generator 358 is twice as long as that of the orthogonal symbol hopping pattern generator 360 described in FIGS. 3A–3C. The exclusive OR gate 390 performs an exclusive-OR operation on the PN sequence output from orthogonal symbol selector 350 and sign components (i.e., plus and minus) from the hopping pattern information bit by bit. Thus, the number of resulting PN sequences is twice as large as that of the PN sequences (orthogonal codes) in FIG. 3A because sign components (+ and −) are added to the latter. As a result, the probability decreases that different base stations use the same PN sequence cyclically shifted to the same amount in the same time period.

Figure 3E:
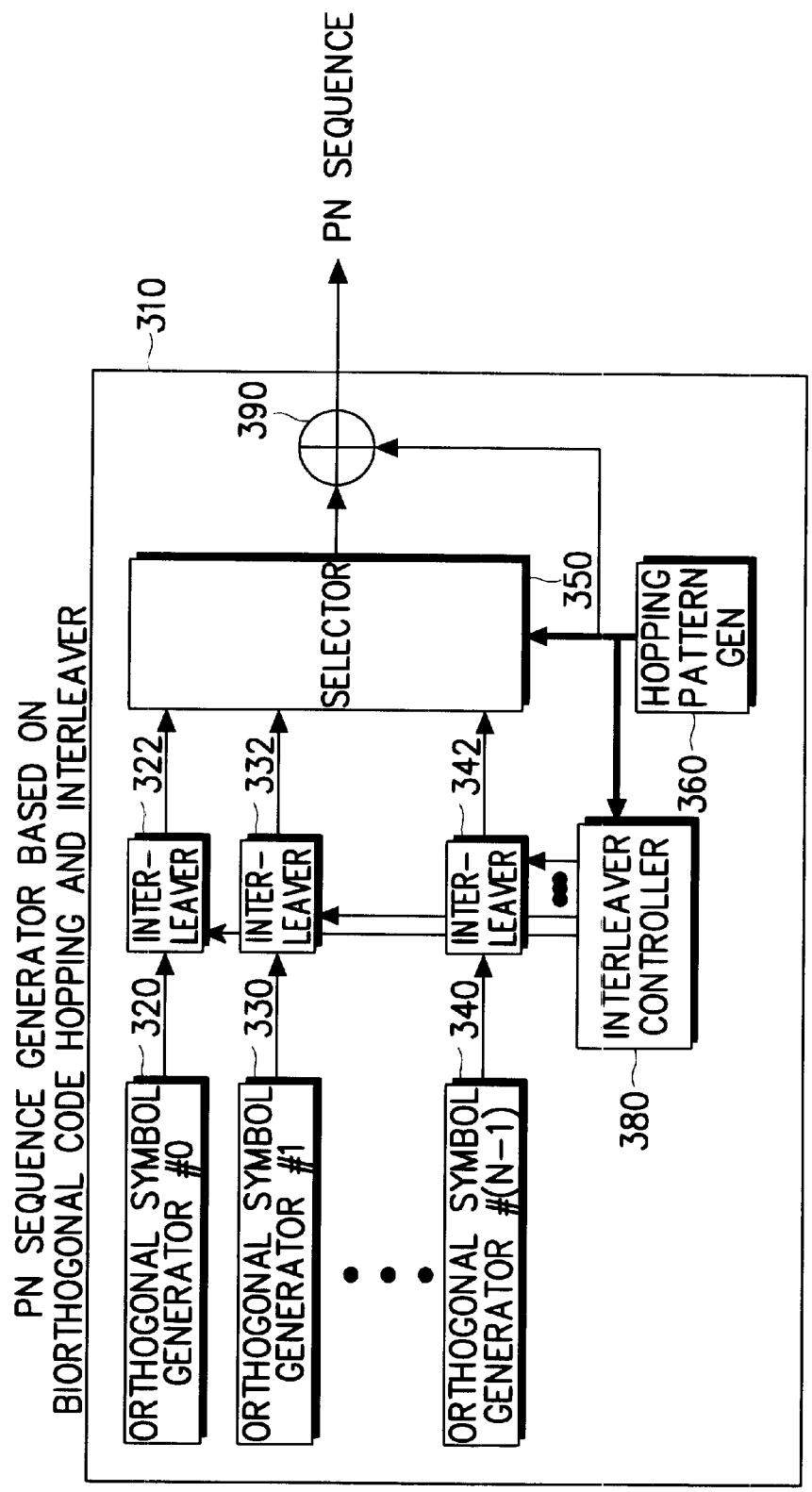

FIG. 3E is a schematic view of a PN sequence generator according to a fifth embodiment of the present invention. Referring to FIG. 3E, the biorthogonal symbol hopping pattern generator 358 generates hopping pattern information of an orthogonal code. The interleaver controller 380 generates an interleaving control signal based on the hopping pattern information received from the biorthogonal symbol hopping pattern generator 358. That is, signal collision is prevented by using different hopping patterns and interleaving schemes in different base stations. The orthogonal symbol generators 320 to 340 generate their corresponding orthogonal symbols to be hopped. The interleavers 322 to 342 interleave orthogonal symbols received from the orthogonal symbol generators 320 to 340 under the control of the interleaver controller 380. The orthogonal symbol selector 350 selectively outputs the interleaved orthogonal symbols under the control of the biorthogonal symbol hopping pattern generator 358. The exclusive-OR gate 390 exclusive-ORs the orthogonal symbol received from the orthogonal symbol selector 350 and the biorthogonal code hopping pattern information to produce a PN sequence.

Therefore, the PN sequence generator of FIG. 3E is a modification of the PN sequence generator based on orthogonal code hopping. In operation, the orthogonal symbol generators 320 to 340 generate orthogonal symbols to be hopped according to a hopping pattern. The biorthogonal symbol hopping pattern generator 358 generates the hopping pattern information of an orthogonal code. The interleaver controller 380 controls interleaving of the orthogonal symbols, and the interleavers 322 to 342 interleave the orthogonal symbols received from the orthogonal symbol generators 320 to 340 according to the hopping pattern. The orthogonal symbol selector 350 selectively outputs the symbols received from the interleavers 322 to 342 according to the hopping pattern to output a PN sequence. With an orthogonal code of the same length given, the output of the biorthogonal symbol hopping pattern generator 358 is twice as long as that of the orthogonal symbol hopping pattern generator 360. The PN sequence selected by the orthogonal symbol selector 350 and the hopping pattern information are exclusive-ORed by a bit like MSB or LSB in the exclusive-OR gate 390.

Figure 3F:
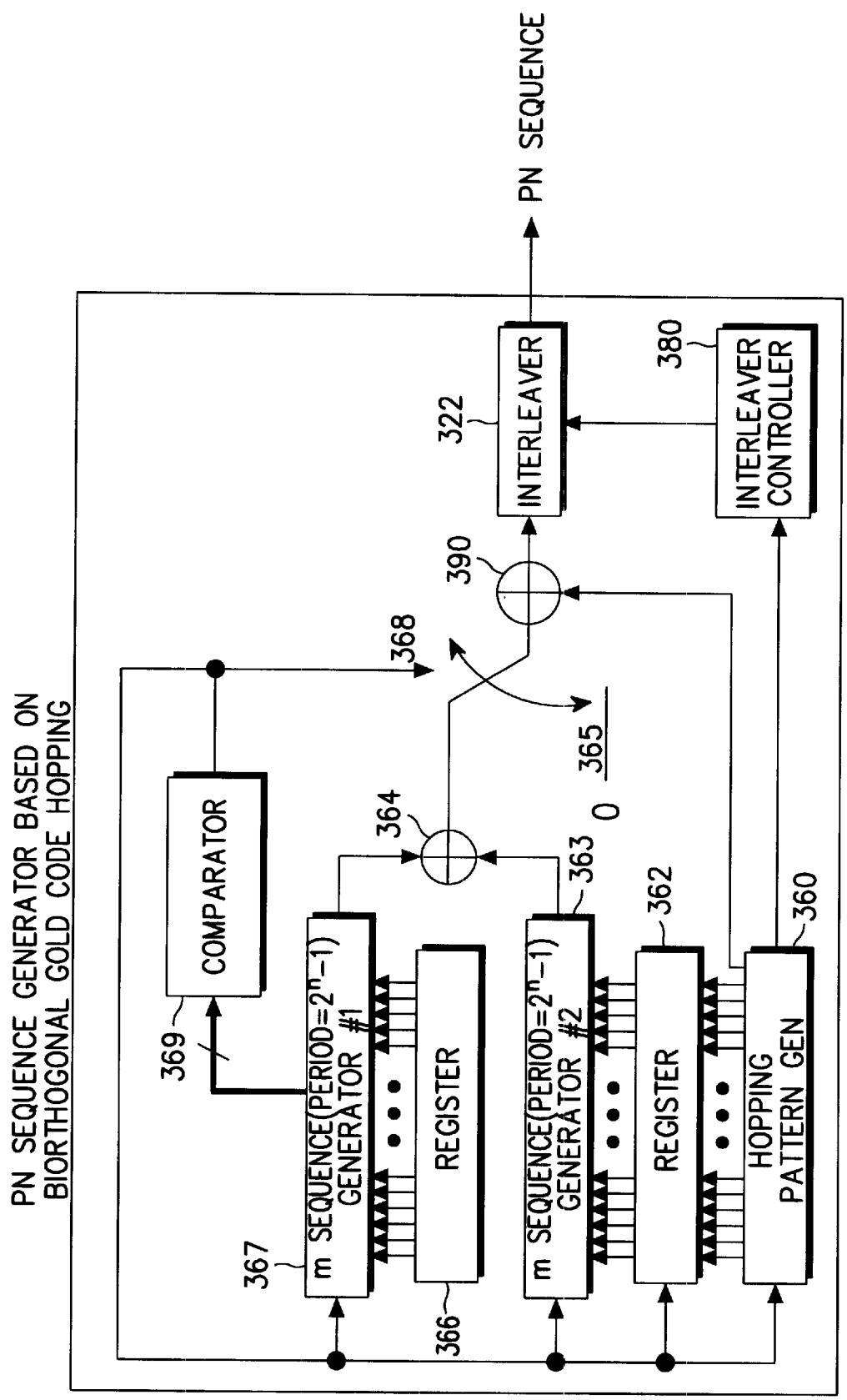

FIG. 3F is a schematic view of a PN sequence generator based on biorthogonal Gold code hopping according to a sixth embodiment of the present invention. Referring to FIG. 3F, the biorthogonal symbol hopping pattern generator 358 generates hopping pattern information of an orthogonal code. The interleaver controller 380 generates an interleaving control signal according to the hopping pattern information received from the biorthogonal symbol hopping pattern generator 358. The initial value register 366 stores an initial value, and the m-sequence generator 367 reads the initial value from the initial value register 366 and generates an m-sequence corresponding to the initial value, the initial value register 362 stores the hopping pattern information as an initial value, and the m-sequence generator 363 generates an m-sequence corresponding to the initial value received from the initial value register 362. Therefore, the m-sequence generators 363 and 367 output different m-sequences. The exclusive-OR gate 364 exclusive-ORs the outputs of the m-sequence generators 363 and 367 to produce a Gold sequence. The comparator 369 compares the status value of the m-sequence generator 367 with a predetermined value and generates a switch controlling signal according to the comparison result. The switch 368 is selectively switched between a zero value input and the output of the exclusive-OR gate 364. The switch selects the zero value input for one clock period responsive to the switch controlling signal received from the comparator 369 when the output of the m-sequence generator 367 is equal to the predetermined value. Otherwise, if the values are different, the switch 368 selects the output of the exclusive-OR gate 364, that is, the Gold sequence. The switch 368 may be implemented as a multiplexer. The exclusive-OR gate 390 exclusive-ORs the orthogonal symbol received from the switch 368 and the biorthogonal code hopping pattern information. The interleaver controller 380 generates a control signal for interleaving the symbols received from the switch 368 according to the hopping pattern information received from the biorthogonal symbol hopping pattern generator 358. The interleaver 322 interleaves the output of the exclusive-OR gate 390 under the control of the interleaver controller 380 to produce a PN sequence.

In operation, the biorthogonal symbol hopping pattern generator 358 determines an initial value for the m-sequence (with a period of $2^n-1$) generator 363. The determined initial value is stored in the register 362. Another m-sequence (with a period of $2^n-1$) generator 367 generates an m-sequence with an initial value with no relation to the biorthogonal symbol hopping pattern generator 358 and the initial value is stored in the register 366. The outputs of the two m-sequence generators 363 and 367 are exclusive-ORed to produce a Gold sequence as output from the exclusive-OR gate 364. To generate a orthogonal Gold code from the Gold sequence, the comparator 369 compares the status value of the m-sequence generator 367 with a predetermined value. If they are equal, the m-sequence generators 363 and 367 are stopped for one clock period, and the switch 368 inserts a zero value into the Gold sequence for the clock period. If they are different, the Gold sequence is selected by the switch 368. With an orthogonal code of the same length given, the output of the biorthogonal symbol hopping pattern generator 358 is twice as long as that of the orthogonal symbol hopping pattern generator 360. The PN sequence output from the switch 368 and the hopping pattern information are exclusive-ORed by a bit like MSB or LSB in the exclusive-OR gate 390. Then, the interleaver 322 interleaves the output of the exclusive-OR gate 390 under the control of the interleaver controller 380.

Figure 4A:
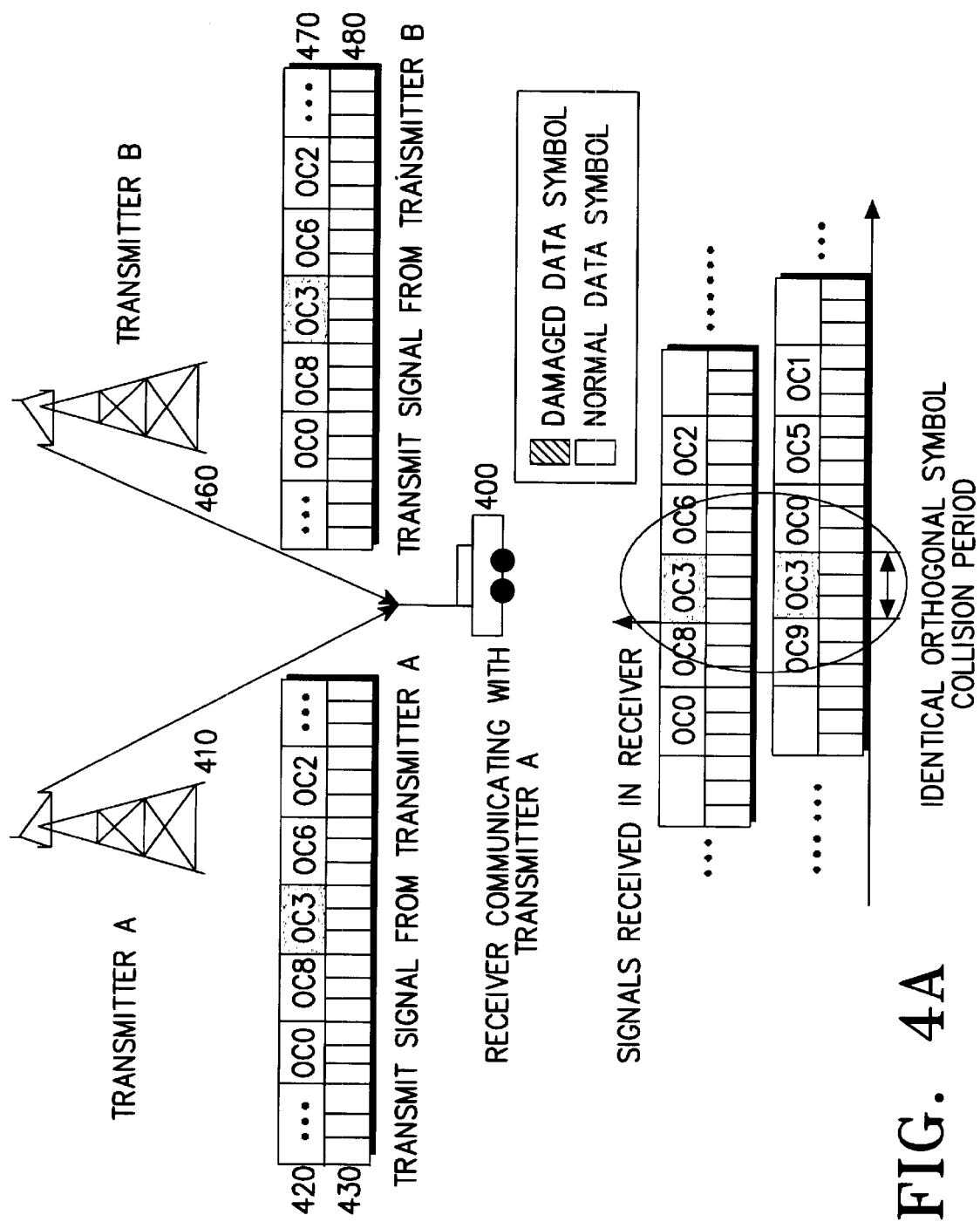
FIGS. 4A and 4B are views illustrating preservation of data symbols in a receiver by preventing collision between signals generated from different transmitters based on the orthogonal, orthogonal Gold, biorthogonal, or biorthogonal Gold code hopping according to the embodiments of the present invention.
Figure 4B:
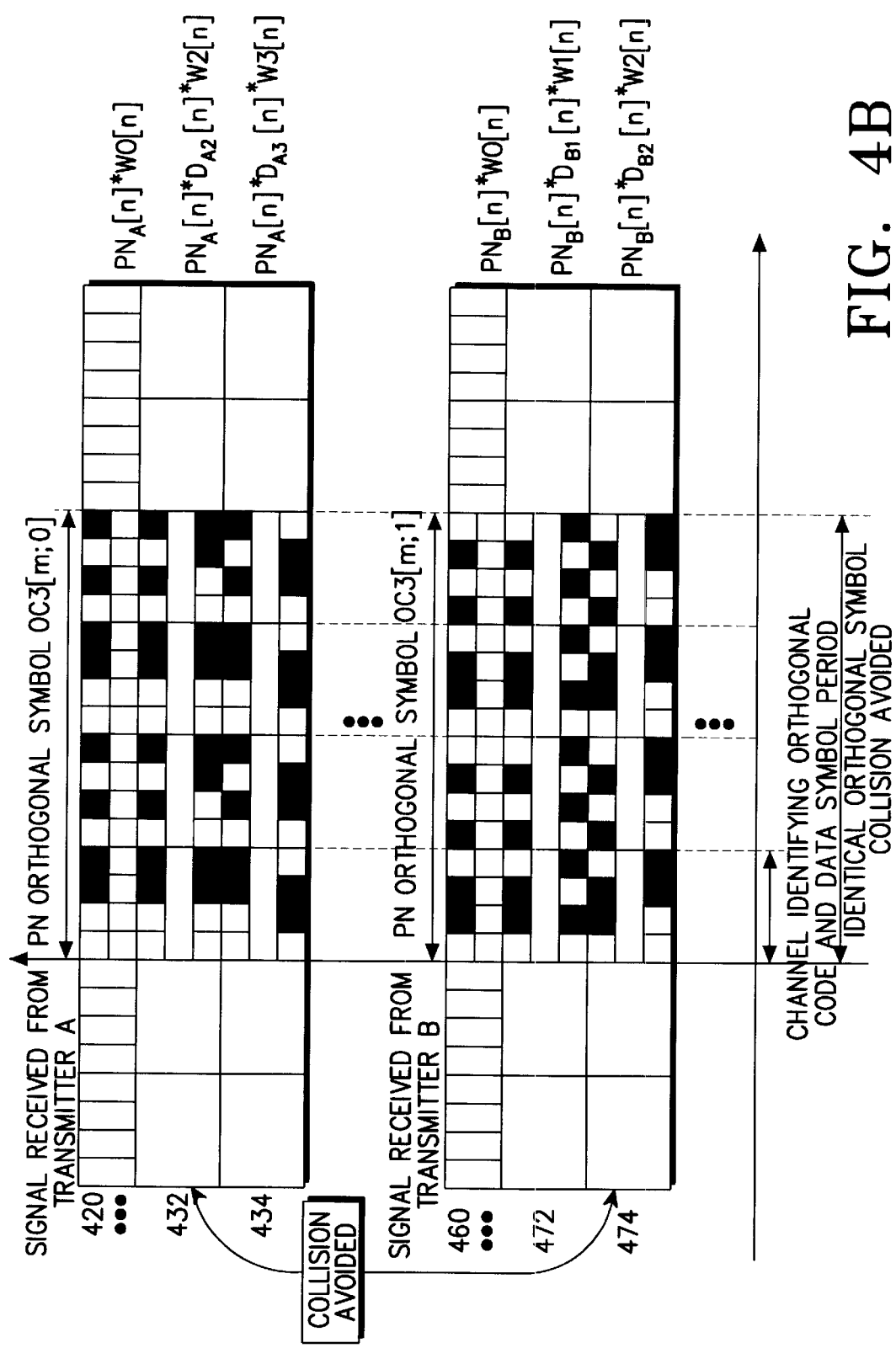

From FIGS. 4A and 4B, it is noted that while a receiver receives signals using the same PN generating orthogonal code OC3 and the same channel identifying orthogonal code at the same time from at least two base stations, different cyclic shift or interleaving for each base station according to the present invention prevents signal collision caused by use of the same code.

A receiver can recover a signal received from a transmitter having a PN sequence generator of the present invention by cyclic shift and deinterleaving according to the same hopping pattern used in the transmitter, or extract the hopping pattern information from a received signal. In this case, the transmitter operates according to an initial hopping pattern for generating a PN sequence when data is initially transmitted, and the receiver also operates according to the initial hopping pattern. If the hopping pattern is changed, the transmitter notifies the receiver of the changed hopping pattern. The receiver includes a lookup table for storing the hopping patterns for PN sequences received from the transmitter, and detects a PN sequence according to hopping pattern information read from the lookup table when the hopping pattern is changed.

The PN sequence generator of the present invention as described above generates a PN sequence by interleaving or cyclically shifting the symbols of an orthogonal code according to a hopping pattern. Therefore, even though a receiver simultaneously receives signals spread by PN sequences generated from hopping of the same orthogonal or biorthogonal code in different transmitters, concurrent spreading of the data symbols can be prevented by varying the amount of interleaving or cyclic shift.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A PN sequence generating device in a CDMA communication system, comprising:

orthogonal symbol generating means for cyclically shifting a plurality of orthogonal symbol sequences; and an orthogonal symbol selector for selectively outputting one of said cyclically shifted orthogonal symbols according to a predetermined pattern.

2. The PN sequence generating device of claim 1, wherein the plurality of orthogonal symbol sequences are one of a mutually orthogonal symbol sequence and a periodic orthogonal symbol sequence.

3. The PN sequence generating device of claim 1, wherein the orthogonal symbol generating means comprises:

a plurality of orthogonal symbol generators for generating said orthogonal symbol sequences; and a plurality of delay devices for cyclically shifting the generated orthogonal symbol sequences.

4. The PN sequence generating device of claim 1, wherein the orthogonal symbol generating means comprises:

a plurality of orthogonal symbol generators for generating mutually orthogonal symbol sequences; and a plurality of interleavers for row permuting the orthogonal code sequences.

5. The PN sequence generating device of claim 1, wherein cyclically shifting the orthogonal symbols is based on a predetermined pattern.

6. The PN sequence generating device of claim 5, wherein the predetermined pattern is an orthogonal symbol hopping pattern.

7. The PN sequence generating device of claim 4, wherein the predetermined pattern is a biorthogonal symbol hopping pattern.

8. A method for generating a PN sequence in a CDMA communication system, comprising the steps of:
   (1) cyclically shifting a plurality of orthogonal code sequences; and
   (2) selectively outputting one of said plurality of cyclically shifted orthogonal code sequences according to a predetermined pattern.

9. The PN sequence generating method of claim 8, wherein the step of cyclically shifting further comprises the steps of:
   generating a plurality of orthogonal code sequences; and
   cyclically shifting said plurality of orthogonal code sequences.

10. The PN sequence generating method of claim 8, wherein the step of cyclically shifting further comprises the steps of:
    generating a plurality of orthogonal code sequences; and
    permuting said plurality of orthogonal code sequences row by row.

11. The PN sequence generating method of claim 8, wherein the cyclic shift operation is based on a predetermined pattern.

12. The PN sequence generating method of claim 11, wherein the predetermined pattern is an orthogonal symbol hopping pattern.

13. The PN sequence generating method of claim 11, wherein the predetermined pattern is a biorthogonal symbol hopping pattern.

* * * * *